(12) United States Patent
Nakamura

(10) Patent No.: US 8,208,059 B2
(45) Date of Patent: Jun. 26, 2012

(54) INTERCHANGEABLE LENS AND IMAGE PICKUP APPARATUS

(75) Inventor: Tomoyuki Nakamura, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 574 days.

(21) Appl. No.: 12/055,807

(22) Filed: Mar. 26, 2008

(65) Prior Publication Data

US 2008/0240709 A1    Oct. 2, 2008

(30) Foreign Application Priority Data

Mar. 30, 2007  (JP) ................. 2007-090305

(51) Int. Cl.
*H04N 9/73* (2006.01)
*H04N 5/225* (2006.01)

(52) U.S. Cl. .................. 348/360; 348/224.1

(58) Field of Classification Search ........... 348/224.1, 348/241, 265, 335–7, 345, 357, 360; 396/354, 396/529

See application file for complete search history.

(56) References Cited

U.S. PATENT DOCUMENTS

| | | | |
|---|---|---|---|
| 5,227,832 A | 7/1993 | Kawasaki et al. | |
| 5,247,326 A * | 9/1993 | Taniguchi et al. | 396/64 |
| 5,293,208 A | 3/1994 | Okano et al. | |
| 5,561,564 A | 10/1996 | Nakamura et al. | 359/825 |
| 5,630,180 A | 5/1997 | Kusaka | |
| 5,654,833 A | 8/1997 | Fujike et al. | 359/822 |
| 5,761,560 A * | 6/1998 | Miyazawa et al. | 396/532 |
| 2005/0158044 A1 | 7/2005 | Ide et al. | |
| 2006/0066957 A1 | 3/2006 | Fukui | |

FOREIGN PATENT DOCUMENTS

| | | |
|---|---|---|
| JP | 61-225988 | 10/1986 |
| JP | 62-194787 | 8/1987 |
| JP | 11-084501 A | 3/1999 |
| JP | 2000-138944 | 5/2000 |
| JP | 2000-206585 A | 7/2000 |
| JP | 2002372662 A * | 12/2002 |
| JP | 2003-069889 A | 3/2003 |
| JP | 2004-112529 A | 4/2004 |

OTHER PUBLICATIONS

Communication, dated Aug. 4, 2010, with a Search Report, date of completion Jul. 27, 2010, in counterpart European Application No. 08153521.3-1522/1976269.

Feb. 28, 2012 Japanese Official Action in Japanese Patent Appln. No. 2008-037421.

* cited by examiner

*Primary Examiner* — Daniel M Pasiewicz
(74) *Attorney, Agent, or Firm* — Fitzpatrick, Cella, Harper & Scinto

(57) ABSTRACT

An interchangeable lens mountable/detachable on/from a camera body is provided with a receiving unit that receives information on photography surroundings and a transmission unit that transmits data for correction of aberration based on the information received by the receiving unit, to the camera body.

15 Claims, 17 Drawing Sheets

FIG. 3

IMAGE HEIGHT →

| ZOOM ↓ | | 10% | ... | 100% |
|---|---|---|---|---|
| | 10% | ΔG(1, 1, f, i)a | | ΔG(1, 10, f, i)a |
| | ⋮ | | | |
| | 100% | ΔG(10, 1, f, i)a | | ΔG(10, 10, f, i)a |

FIG. 4

COEFFICIENT

| | | A | B | C | D | E | F |
|---|---|---|---|---|---|---|---|
| ZOOM ↓ | 10% | ΔR(1, f, i)a | ΔR(1, f, i)b | ΔR(1, f, i)c | ΔR(1, f, i)d | ΔR(1, f, i)e | ΔR(1, f, i)f |
| | ⋮ | ⋮ | ⋮ | ⋮ | ⋮ | ⋮ | ⋮ |
| | 100% | ΔR(10, f, i)a | ΔR(10, f, i)b | ΔR(10, f, i)c | ΔR(10, f, i)d | ΔR(10, f, i)e | ΔR(10, f, i)f |

INTERCHANGEABLE LENS AND IMAGE PICKUP APPARATUS

BACKGROUND OF THE INVENTION

1. Field of the Invention

The present invention relates to an interchangeable lens that transmits suitable aberration correction data for digital aberration correction to a camera body in accordance with the type of the camera body or other conditions.

2. Description of the Related Art

In camera systems such as color digital still cameras and video cameras, a color image is reproduced by superimposing images of R (red), G (green) and B (blue) channels. When an object image is imaged on an image pickup element through a lens, a registration error and distortion occur. One of the causes thereof is aberration of the lens, and in particular lateral chromatic aberration and distortion do matter.

Various methods of electrically correcting lateral chromatic aberration and distortion have been conventionally developed. For example, Japanese Patent Application Laid-Open No. 2000-138944 discloses a correction method in which the positions of the pixel outputs of color components that involve registration errors or color registration errors between channels are changed.

Japanese Patent Application Laid-Open No. S61-225988 directed to a data transfer method for an electronic still camera or video camera that uses an interchangeable lens discloses a camera apparatus that is adapted to identify the model number or type of a lens and reads precise correction data suitable for the model number or type of the lens.

Furthermore, Japanese Patent Application Laid-Open No. S62-194787 discloses a camera that uses a lens having a built-in extender function in which a distortion correction amount is changed between when the lens extender is used and when it is not used.

In the systems like those disclosed in Japanese Patent Application Laid-Open No. S61-225988 and Japanese Patent Application Laid-Open No. S62-194787 in which correction data is changed according to the type of the lens or the condition of use thereof, the correction data sent out from the lens is changed or the correction data to be used is selected from among a sets of correction data the camera body has, when the optical system is changed. In such systems, however, no consideration is given to situations in which one interchangeable lens is to be mounted on a plurality of different camera bodies as is the case with lenses for broadcasting cameras or situations in which one interchangeable lens is to be mounted on a camera body in different shooting conditions or in different shooting modes.

Furthermore, broadcasting cameras may have different required resolutions such as high definition (HD), standard definition (SD) and a resolution for cinema. FIG. 16 shows lateral chromatic aberration associated with camera characteristics A and B. Characteristics for the respective colors may vary depending on the mode and type of the camera even if the same lens is used. Accordingly, it is necessary in broadcasting image pickup systems to taking into consideration situations in which the same lens is mounted on different types of cameras or situations in which the same type of camera is used for shooting in different shooting conditions or different shooting modes.

SUMMARY OF THE INVENTION

An object of the present invention is to eliminate the above described disadvantages of the prior arts and provide an interchangeable lens that enables to achieve optimum aberration correction adapted to various conditions.

An interchangeable lens according to the present invention that is intended to achieve the above object is an interchangeable lens mountable/detachable on/from a camera body, comprising a receiving unit that receives information on photography surroundings and a transmission unit that transmits data for correction of aberration based on the information received by the receiving unit, to the camera body.

Further features of the present invention will become apparent from the following description of exemplary embodiments with reference to the attached drawings.

BRIEF DESCRIPTION OF THE DRAWINGS

FIG. 3 is a first exemplary data table according to the first embodiment.

FIG. 4 is a second exemplary data table according to the first embodiment.

DESCRIPTION OF THE EMBODIMENTS

Figure 1:
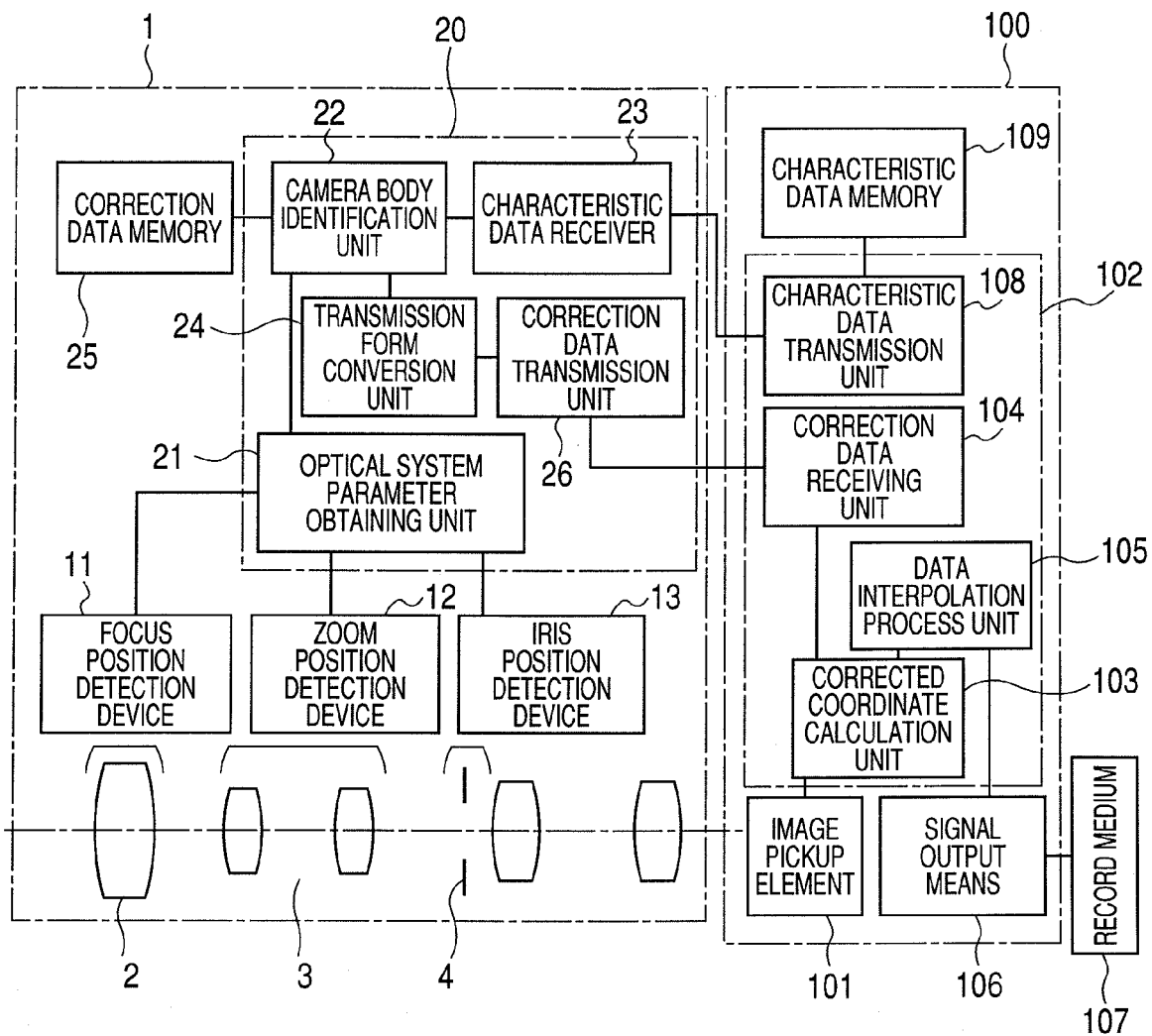
FIG. 1 is a diagram showing the configuration of a first embodiment.

In the interchangeable lens (in particular, an interchangeable lens or shooting optical system for broadcasting systems) according to this embodiment, it is necessary to taking into consideration situations in which the same lens is to be mounted on different types of cameras and situations in which the same lens is to be mounted on the (same) camera in different shooting conditions (different types of the light source) or in different shooting modes. This embodiment addresses to changes in lateral chromatic aberration (or magnitude thereof) that should be taken into account in cases where the same interchangeable lens is to be mounted on different types of cameras and in cases where the same interchangeable lens is to be mounted on the camera in different shooting conditions or in different shooting modes. Specifically, in the interchangeable lens according to this embodiment, data concerning the interchangeable lens transmitted from the interchangeable lens to the camera body is changed when it is mounted on a camera having different photography surroundings (i.e. different in the camera type, shooting condition and/or shooting mode) as described above. In this embodiment, the camera body has a color separation optical system (in the form of a prism) that separates light to be shot delivered from the shooting lens (interchangeable lens) into three color lights of red (R) green (G) and blue (B) and image pickup elements (not shown) for the respective color lights. In this embodiment, occurrence of lateral chromatic aberration may lead to differences in the size, the way of distortion and the amount of distortion of images formed on the respective image pickup elements, which can sometimes cause color fringing appearing upon composing a color image from images of the three colors. In this embodiment, in order to obtain color images with no (or little) color fringing even in situations in which lateral chromatic aberration occurs as above, digital image correction (or modification) is performed (by image processing). Suitable data required to correct images digitally (including data concerning lateral chromatic aberration and data concerning distortion for every color light) is transmitted from the interchangeable lens to the camera body.

In this embodiment, the data concerning an interchangeable lens includes data concerning lateral chromatic aberration (and other aberrations) (in particular, aberration that varies depending on the wavelength of light) or data to be used in correcting such aberration. In the description of this embodiment, "different types of cameras" refer to cameras having different resolutions such as HD cameras and SD cameras as mentioned above and cameras manufactured by different manufacturers and configured to receive different types (data formats) of signals. Furthermore, "the different shooting conditions" include shooting under sunlight (outdoor shooting), shooting under electric light (indoor shooting), shooting under low light (night scene shooting) and a condition in which saturation (signal saturation) occurs. In other words, the shooting condition refers to the spectral distribution of light with which the object to be shot is illuminated. In this embodiment, the spectral distribution is detected (or determined) based on light incident on an image pickup element, an AF sensor or other brightness sensors. Still further, "the different shooting modes" include the indoor shooting mode, outdoor shooting mode, night scene shooting mode, shooting mode for situations in which saturation will occur (i.e. shooting mode for preventing saturation from occurring) etc, as described before.

The type of the camera body, shooting condition, shooting mode, etc. may be determined by means of signal communication with the camera body, based on the result of detection by a sensor provided on the interchangeable lens body or based on manual entry performed by the camera operator. The sensor mentioned here is, for example, a brightness sensor provided to determine shooting conditions, and it is desirable, ideally, that the sensor be adapted to detect light emitted from the light source by which the object to be shot is illuminated (namely, the spectrum of light is to be detected by a brightness sensor provided on or in the vicinity of the object to be shot). However, it is difficult to provide a brightness sensor on or in the vicinity of the object to be shot, and so the brightness sensor may be provided on (the exterior of) the interchangeable lens, on (the exterior of) the camera body or at a position in the optical system on which a portion of light to be shot is incident. Alternatively, the shooting condition may be determined, as a matter of course, based on the spectral distribution of the light to be shot received by the image pickup elements 101, as is the case with the seventh embodiment that will be described later.

In the interchangeable lens according to this embodiment, the data sent from the interchangeable lens to the camera body is changed based on at least one of data received from the camera body, the result of detection by a detector (or sensor) provided on the interchangeable lens and an input signal input to the interchangeable lens. The functions of receiving information on the photography surroundings, determining the photography surroundings (including the spectral distribution of the light source with which the object to be shot is illuminated, the shooting mode and the camera type) and transmitting data from the interchangeable lens to the camera body are performed by the same single calculation circuit (CPU) provided in the interchangeable lens. However, these functions (as a receiving unit, a photography surroundings determination unit and a transmission unit) may be performed respectively by different calculation circuits. In this connection, the receiving unit may be configured to receive various kinds of information from the camera body and/or detection signals of sensors provided in the interchangeable lens (such as a light receiving sensor (light sensor) for auto focusing, a light detector like a brightness sensor provided on the exterior of the interchangeable lens and a light receiving sensor).

With the above described features, suitable data (data for correction of aberration) can be transmitted to the camera body in accordance with the camera used, the circumstances under which the camera is used (or shooting condition) and/or the shooting mode etc, so that appropriate aberration correction can be performed to provide high quality images. Here, the data for correction of aberration refers to data that is used, when images of different colors (specifically, red, green and blue images) are distorted in different manners due to effects of aberration, to correct the distortions digitally (by image processing), that is, data indicative of (or relating to) how and by what extent the images of the respective colors are distorted.

As will be understood from the foregoing and following descriptions, in this embodiment, if the photography surrounding changes, the aberration correction data transmitted from the interchangeable lens to the camera body is also changed naturally. There may be cases in which the same aberration correction data is sent in different photography surroundings as a matter of course, but such cases are exceptional.

In the following, specific embodiments will be described in detail with reference to FIGS. 1 to 22.

(First Embodiment)

FIG. 1 is a diagram showing the configuration of a shooting apparatus according to a first embodiment. The interchangeable lens 1 is adapted to be mountable/detachable on/from the camera body 100. The interchangeable lens 1 has a focusing lens (focusing lens unit) 2, a zoom lens (zooming lens unit or variator lens unit) 3 and an iris (light quantity regulation unit) 4 arranged on the optical axis. The positions of the focusing lens 2, the zoom lens 3 and the iris 4 are adapted to be detected by a focus position detection device 11, a zoom position detection device 12 and an iris position detection device 13 respectively. Optical system parameters that will be described later include at least one of information on the current positions of the focusing lens 2 and the zoom lens 3, information on the focal length and the aperture value (or a value indicative of the degree of opening of the iris) of the iris 4.

The outputs of these position detection devices 11 to 13 are connected to an optical system parameter obtaining unit 21 in a calculation unit 20 in the form of a CPU or the like, and the output of the optical system parameter obtaining unit 21 is connected to a camera body identification unit 22. The camera body identification unit 22 is connected with a characteristic data receiving unit 23, a transmission form conversion unit 24 and a correction data memory 25 separated from the calculation circuit 20.

The characteristic data receiving unit 23 is connected with the camera body 100, and the transmission form conversion unit 24 is also connected with the camera body 100 via a correction data transmission unit 26. In the correction data memory 25 is stored data for correcting distortion for R, G and B associated with the optical system.

The camera body 100 has an image pickup element 101 provided on the object-image side of the interchangeable lens 1 including the focus lens 2 etc. The output of the image pickup element 101 is connected to a corrected coordinate calculation unit 103 in a calculation unit 102 in the form of a CPU or the like. The outputs of the corrected coordinate calculation unit 103 are connected to a correction data receiving unit 104 that receives correction data from the interchangeable lens 1 and a data interpolation process unit 105. Furthermore, the output of the data interpolation process unit 105 is connected to a signal output means 106 provided externally of the calculation circuit 102, and the output of the signal output means is connected to a recording medium 107 separated from the camera body 100.

A characteristic data transmission unit 108, provided in the calculation unit 102, that transmits characteristic data to the interchangeable lens 1 is connected to a characteristic data memory 109 separated from the calculation circuit 102. In the characteristic data memory 109 is stored characteristic data of the camera body 100. Although the recording medium 107 is separated from the camera body 100 in the illustrated embodiment, it may be a built-in medium provided in the camera body 100.

Figure 2:
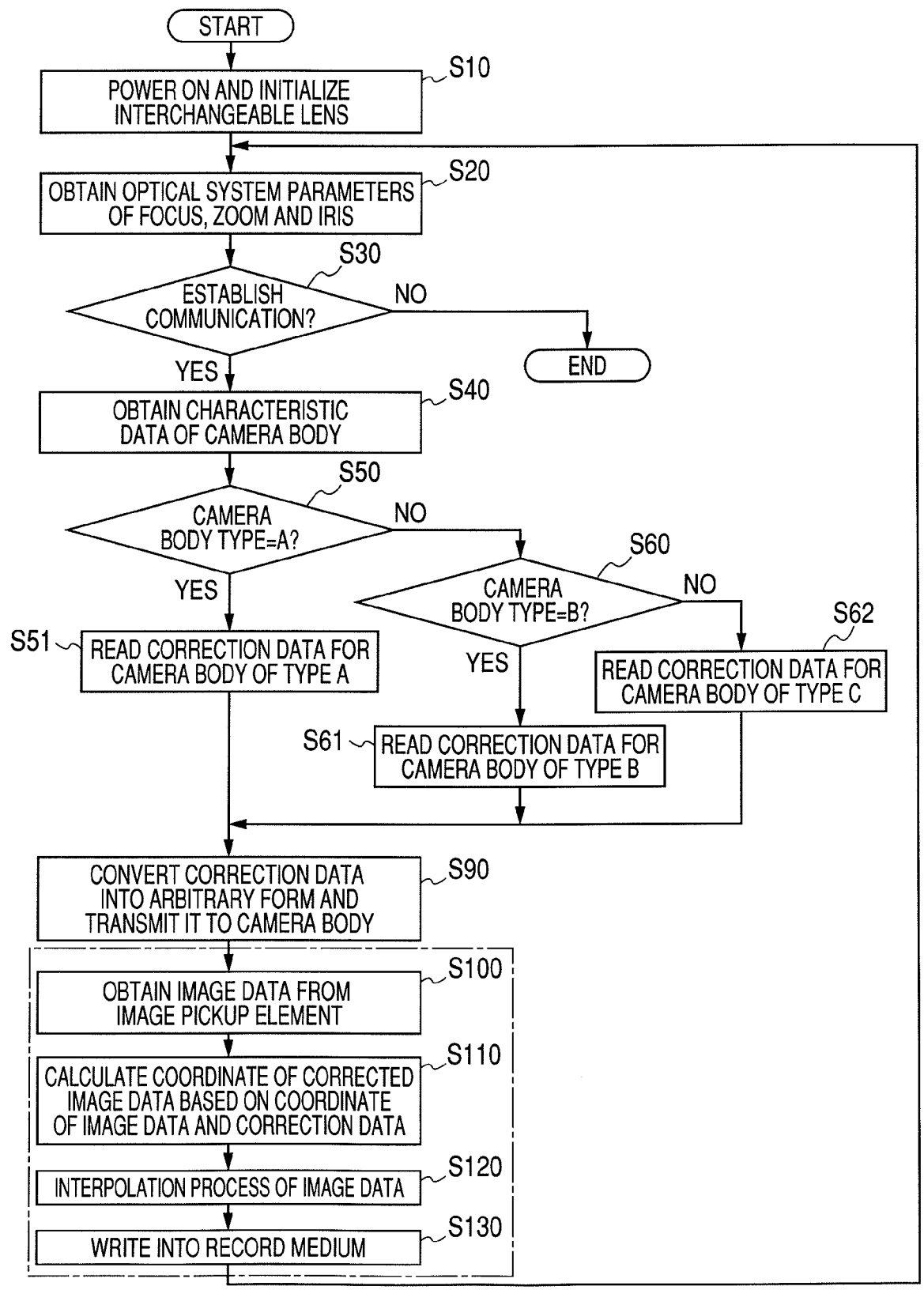
FIG. 2 is a flow chart of a process according to the first embodiment.

FIG. 2 is a flow chart of a process of correcting a shot image in the camera body 100 with the interchangeable lens 1 shown in FIG. 1. First, power of the interchangeable lens 1 is turned on and initialization is performed (step S10). Upon completion of the initialization, the position detection devices 11 to 13 send the optical system parameters of the focusing lens 2, zoom lens 3 and the iris 4 to the optical system parameter obtaining unit 21. The data received by the optical system parameter obtaining unit 21 is transferred to the camera body identification unit 22, where the initial status of the optical system is recognized (step S20).

Then, the interchangeable lens 1 calls the camera body 100. If the interchangeable lens 1 receives a response from the camera body 100, communication is established and the process proceeds to the subsequent process steps, while if no response is received in spite of several calls, the subsequent process steps are cancelled with a determination that the camera body 100 is of a type that cannot communicate (step S30). Upon detecting the establishment of communication, the characteristic data transmission unit 108 reads characteristic data from the characteristic data memory 109 of the camera body 100 and transmits it to the interchangeable lens 1. The characteristic data receiving unit 23 in the interchangeable lens 1 receives this data and transfers it to the camera body identification unit 22 (step S40).

The camera body identification unit 22 identifies the type of the camera body 100 based on the characteristic data (steps S50 and S60). If the type is identified to be registered type A or type B, data matching to or nearly matching to the optical system parameters that have already been obtained in step S20 are read from the correction data memory 25 for the corresponding type of data corresponding to the type of the identified camera body (steps S51, S61).

If there is no corresponding type registered, the data of the design values (type C) are read from the correction data memory 25 (step S62).

The data read in steps S51, S61 and S62 is sent to the transmission form conversion unit 24, where the data form and the transmission form are converted to accord with the type of the camera body 100. The data after conversion is transmitted to the correction data receiving unit 104 in the camera body 100 via the correction data transmission unit 26 (step S90).

On the other hand, the object image shot by the camera body 100 is imaged on the image pickup element 101 through the optical system including the focusing lens 2 etc, and image data thereof is sent to the corrected coordinate calculation unit 103 (step S100). In the corrected coordinate calculation unit 103 which receives the correction data from the correction data receiving unit 104, the image data supplied from the image pickup element 101 is separated into position data and brightness data for each of the R, G and B channels. Then, a corrected coordinate data value for each of colors of R, G and B is calculated from the correction data and position data for each color channel (step S110). Since in this process some of the corrected position coordinates overlap, and some position coordinates lack data, an interpolation process is performed in the data interpolation process unit 105 (step S120). The image data after data interpolation is sent to the signal output means 106 and written into the recording medium 107 (step S130). Alternatively, in the case where real-time visualization is performed, the image is directly output from the signal output means 106.

Since the above described process steps S20 to S130 are executed for every image, the steps S20 to S130 are executed repeatedly on a frame by frame basis. Among these process steps, the step of checking establishment of communication and the step of identifying the type of the camera body 100 are not needed to be performed every time, but they may be omitted appropriately.

FIG. 3 illustrates an example of the way of storing correction data in the correction data memory 25 used in steps S51, S61 and S62. The correction data memory 25 stores data in the form of a table. The table includes data for distortion correction amounts for the G channel in relation to variations in the zoom and image height at a certain position f of the focusing lens 2 and a certain position i of the iris 4.

In the table, the row represents the zoom position, where the zoom position changes from wide-angle to telephoto in the direction from top to bottom of the table. The column represents the image height from the optical axis, where the position changes away from the optical axis in the direction from left to right of the table.

It is necessary to prepare two similar tables additionally for the R channel and the B channel at least. If there are plurality of data in association with changes in the focus position (close-infinity) and changes in the iris position (open-close), further tables need to be prepared accordingly. The distortion correction amount is generally about 12% at maximum in relation to the field of view. Thus, for example in the case of HD (high definition) with 1920×1080 pixels, the correction amount will be up to 130 pixels or so. Therefore appropriate correction can be made normally by preparing tables with 2 byte data.

FIG. 4 also illustrates an example of the way of storing the correction data used in steps S51, S61 and S62 as with FIG. 3. In the table shown in FIG. 4, data is stored as coefficients. A distortion correction amount associated with the image height is represented by two coefficients. In the table of FIG. 4, the row represents the zoom position, and this single table can provide the correction amounts associated with the zoom position and the image height for all of the R, G and B channels.

The table of FIG. 4 has coefficients of quadratic functions representing the correction amount along the image height direction. Specifically, correction amounts ΔR, ΔG and ΔB respectively in the R, G and B channel at an arbitrary image height h can be calculated using coefficients A to F in the following equations (1).

$$\Delta R(h,z,f,i)_a = Ah^2 + Bh$$
$$\Delta G(h,z,f,i)_a = Ch^2 \cdot Dh$$
$$\Delta B(h,z,f,i)_a = Eh^2 - Fh \qquad (1)$$

These two different forms of tables can be converted mutually. To convert the table of the form shown in FIG. 3 into the table of the form shown in FIG. 4, fitting based on the least square method is performed using the table of correction amounts associated with the image height shown in FIG. 3, whereby two coefficients shown in equations (1) can be obtained. On the other hand, to convert the table of the form shown in FIG. 4 to the table of the form shown in FIG. 3, image heights h are substituted into equations (1), whereby correction amounts can be obtained.

Thus, if one of these type of tables is prepared and the calculation circuit 20 that can convert the table form is provided in the interchangeable lens 1, the interchangeable lens 1 can answer to a request for either form of data from the camera body 100. In the system shown in FIG. 1, the transmission form conversion unit 24 in the calculation circuits 20 has this function.

Since the transmission form may differ among camera bodies 100, it is necessary to convert data form into not only common transmission forms such as RS-232C but also a transmission form adapted to a format peculiar to the camera body 100. In the system shown in FIG. 1, such conversion of the transmission form is also performed by in the transmission form conversion unit 24 simultaneously with the above described data form conversion.

In the table shown in FIG. 4, data associated with not only the image height but also the zoom position may be expressed by an equation. For example, the correction amount at an arbitrary image height h and an arbitrary zoom position z can be expressed, for example, by equation (2) below.

$$\Delta G(h,z,f,i)_a = Ah^2 z^2 Bh^2 z - Ch z^2 + Dh^2 + Ez^2 - Fhz + Gh + Hz \qquad (2)$$

In this case, it is not necessary to prepare a table data associated with the zoom position, and so the amount of data in the table can be further reduced, though the calculation time will be increased.

Although the table shown in FIG. 3 is prepared in association with the zoom position and the image height on which variations in the lateral chromatic aberration depends relatively largely, the data associated with the image height may be reduced to increase the processing speed if the data amount is so large as to lead to excessive correction. In some optical system types, the table may be prepared in association with the focus position and the iris position without causing any problem. Although quadratic functions are used in the case shown in FIG. 4, more accurate correction values can be obtained if functions of a higher order are used to express the correction values.

(Second Embodiment)

Figure 5:
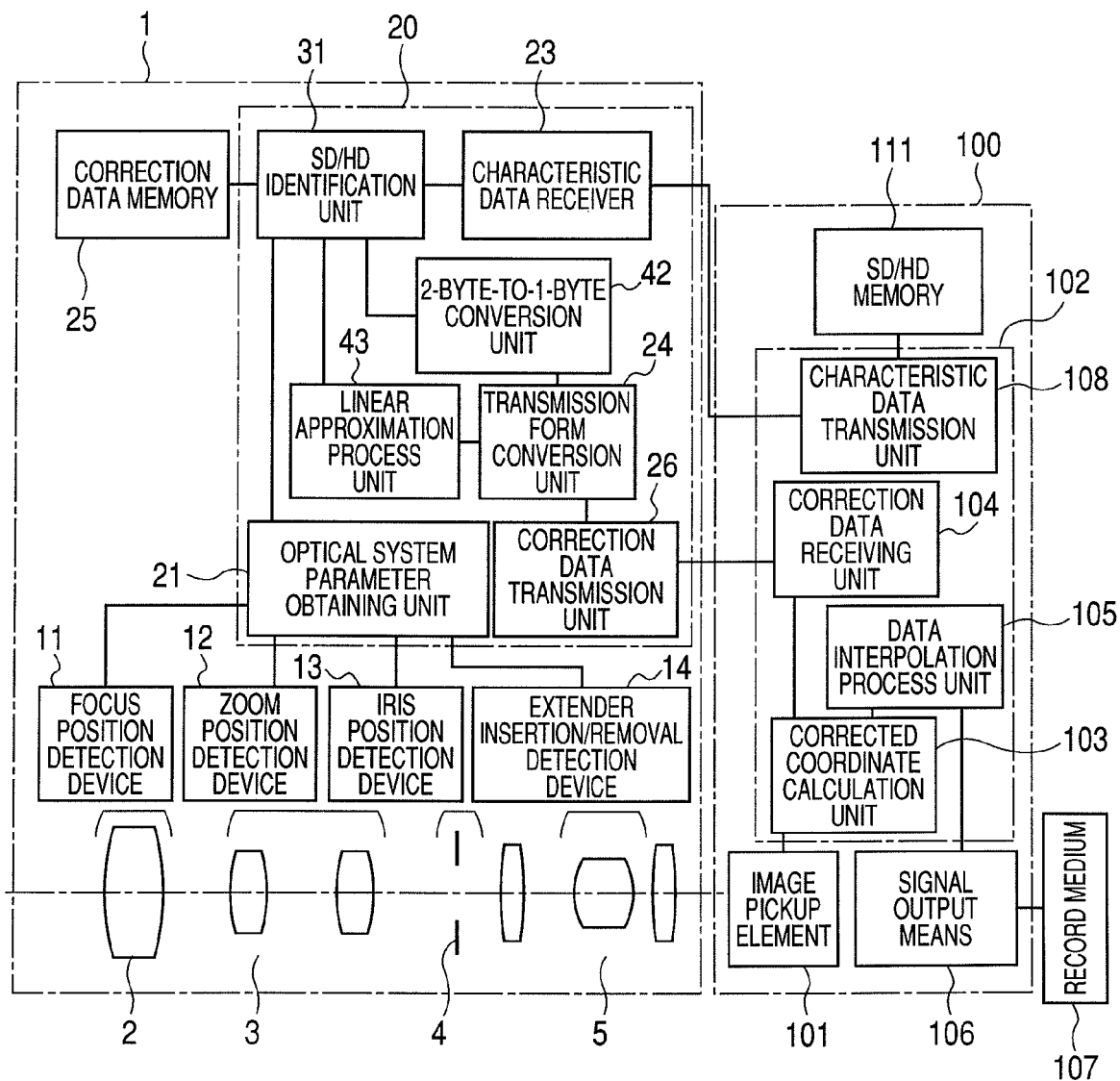
FIG. 5 is a diagram showing the configuration of a second embodiment.

FIG. 5 is a diagram showing the configuration of a second embodiment. In FIG. 5, the components same as those in FIG. 1 are given the same reference numerals. The apparatus according to the second embodiment has an extender lens 5 that can be inserted onto/removed from the optical axis and an extender insertion/removal detection device 14 that detects insertion and removal of the extender lens 5. The output of the extender lens insertion/removal detection device 14 is connected to an optical system parameter obtaining unit 21.

The output of the optical system parameter obtaining unit 21 is connected to an SD/HD identification unit 31. The outputs of the SD/HD identification unit 31 are connected to a characteristic data receiving unit 23, a 2-byte-to-1-byte conversion unit 42 and a linear approximation process unit 43. The output of the linear approximation process unit 43 is connected to a transmission form conversion unit 24.

In the camera body 100, an SD/HD memory 111 in which data indicative of whether the camera body 100 supports SD or HD is stored is connected to a characteristic data transmission unit 108.

Figure 6:
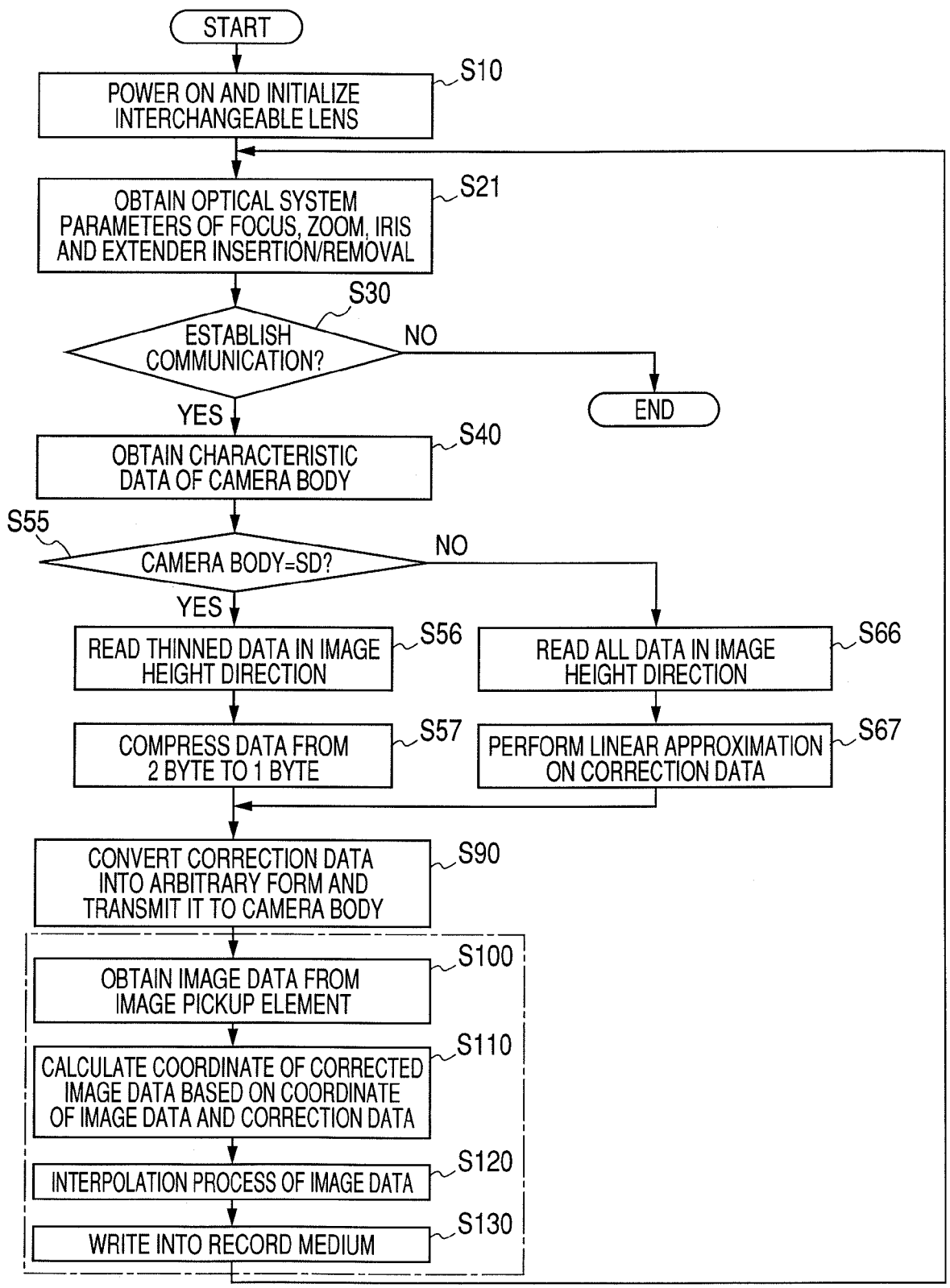
FIG. 6 is a flow chart of a process according to the second embodiment.

FIG. 6 is a flow chart of a process in the apparatus according to the second embodiment. First, initialization is performed upon turning on power of the interchangeable lens 1 (step S10). Upon completing the initialization, the optical system parameter obtaining unit 21 obtains parameters indicative of the positions of the focusing lens 2, zoom lens 3 and iris 4 and insertion/removal of the extender lens 5 from the respective detection units 11 to 14 (step S21).

Then, the interchangeable lens 1 calls the camera body 100. If a response to the call is received and communication is established (step S30), the characteristic data transmission unit 108 reads data indicative of whether the camera body 100 supports SD or HD from the SD/HD memory 111 and transmits it to the interchangeable lens 1. The characteristic data receiving unit 23 in the interchangeable lens 1 receives the data and transfers it to the SD/HD identification unit 31 (step S40).

The SD/HD identification unit 31 identifies whether the camera body 100 supports SD or HD, from the data it has received (step S55). In cases where the camera body 100 supports SD, the permissible circle of confusion is approximately twice as large as that in HD. Accordingly, the SD/HD identification unit 31 reads data, among correction data, matching to or nearly matching to the optical system parameters that have been already obtained in step S21 from the correction data memory 25 while thinning the data with respect to the image height down to a pitch that is sufficient for enabling correction for the SD resolution of a pixel size of 10 μm (step S56). The data thus read is sent to the 2-byte-to-1-byte conversion unit 42, where the data is compressed at a compression ratio of 256:1 (the fractional portion being disregarded) and then sent to the transmission form conversion unit 24 (step S57).

On the other hand, in cases where the camera body supports HD, it has a higher resolution of a pixel size of 5 μm as compared to SD, and the permissible circle of confusion is approximately half that of SD. Therefore, the SD/HD identification unit 41 reads the correction data that match to or nearly match to the optical system parameters that have been already obtained in step S20 for all the image heights (step S66). If the identification of SD or HD is impossible, the data for all the image heights is read as with the case of HD. The data thus read is sent to the linear approximation process unit 43, where linear approximation process is performed on the data, and then the data is sent to the transmission form conversion unit 24 (step S67).

The data form of the data received in the transmission form conversion unit 24 is converted into a data form required by the camera body 100, and then the data is transmitted to the correction data receiving unit 104 through the correction data transmission unit 26 (step S90).

The process steps S100 to S130 executed in the camera body 100 are the same as those in the flow chart of FIG. 2.

Figure 7:
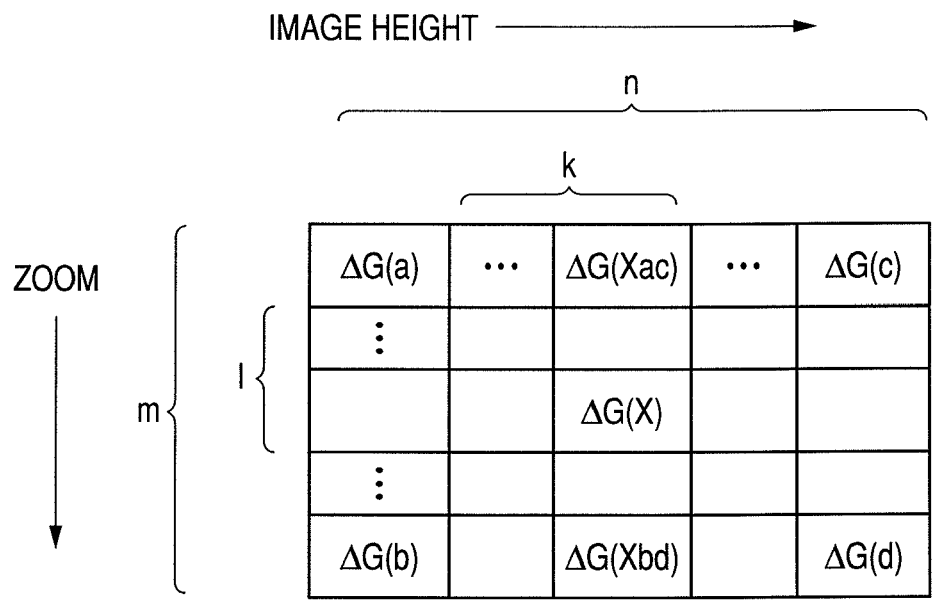
FIG. 7 illustrates a linear approximation process within a table.

FIG. 7 is a diagram illustrating the linear approximation process in step S67 and shows a portion of the data shown in FIG. 3. If the correction data table does not include a correction data which exactly matches the zoom and image height positions of the optical parameters represented by X in FIG. 7 which is obtained by the optical parameter obtaining unit 21, the correction data for the zoom and image height positions is calculated as described below. The correction data for X ($\Delta G(X)$) is calculated from four data $\Delta G(a)$, $\Delta G(b)$, $\Delta G(c)$ and $\Delta G(d)$ in the neighborhood by linear approximation.

The number of division of data that is needed to achieve required accuracy sufficiently is determined in advance. Here, for the purpose of discussion, it is assumed that n divisions with respect to the zoom position and m divisions with respect to the image height are needed. Since X corresponds to the k-th division with respect to the image height, the interpolated correction data ($\Delta G(X_{ac})$) where $X_{ac}$ is in the k-th division in the series of n data divisions a through c and the interpolated correction data ($\Delta G(X_{bd})$) where $X_{bd}$ is in the k-th division in the series of n data divisions b through d are calculated as a preliminary step in calculating the interpolated correction data ($\Delta G(X)$). The equations (3) and (4) used in these calculations are give below, $$\Delta G(a) - (\Delta G(a) - \Delta G(c)) \times \frac{k}{n-1} = \Delta G(X_{ac}), \text{ and} \quad (3)$$

$$\Delta G(b) - (\Delta G(b) - \Delta G(d)) \times \frac{k}{n-1} = \Delta G(X_{bd}), \quad (4)$$

where $\Delta G(x)$ represents a correction data for the optical parameter x.

Since X positions in the l-th division with respect to the zoom position, the interpolated correction data ($\Delta G(X)$) is calculated as the interpolated value for the l-th division in the series of m data divisions $X_{ac}$ through $X_{bd}$. The equation (5) used in this calculation is given below.

$$\Delta G(X_{ac}) - (\Delta G(X_{ac}) - \Delta G(X_{bd})) \times \frac{l}{m-1} = \Delta G(X) \quad (5)$$

Figure 8:
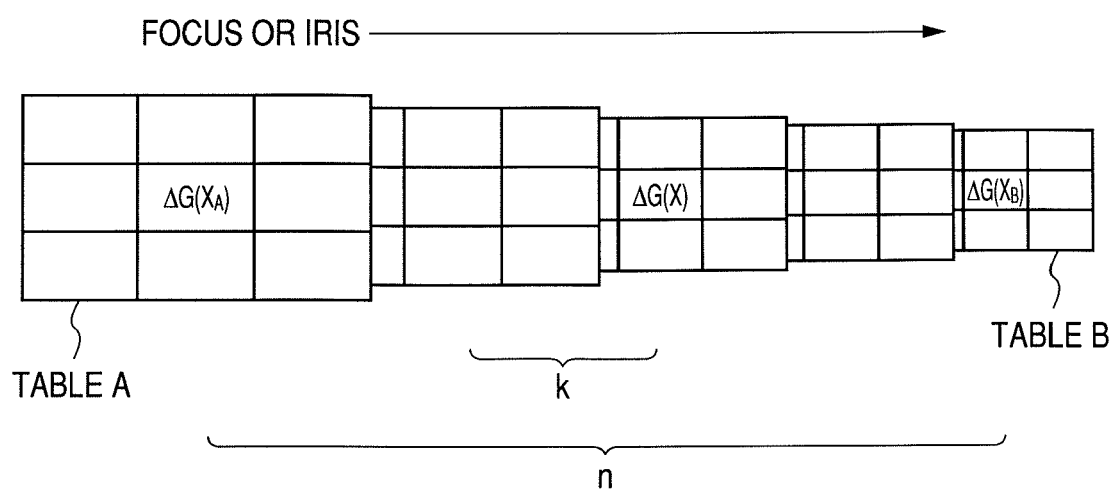
FIG. 8 illustrates a linear approximation process between a plurality of tables.

FIG. 8 is a diagram illustrating the linear approximation process in step S67 in the flow chart of FIG. 6. FIG. 8 illustrates a concept of handling of data between tables rather than handling of data within a single table. This concept is applied to both the focus position and iris position in the same manner.

The reference character X in FIG. 8 represents the position of the optical parameters obtained by the optical parameter obtaining unit 21. If there is no table which exactly matches the focus and iris positions of X, the correction data ($\Delta G(X)$) is calculated from tables A and B in the neighborhood by linear approximation. Suppose that $X_A$ in table A and $X_B$ in table B represent the zoom and image height positions corresponding to those of X. The interpolated correction data ($\Delta G$ (X)) can be calculated from the values of $\Delta G$ ($X_A$) and $\Delta G$ ($X_B$) by linear approximation.

The interpolated correction data (Y(X)) is calculated by the following equation (6), $$\Delta G(X_A) - (\Delta G(X_A) - \Delta G(X_B)) \times \frac{k}{n-1} = \Delta G(X), \quad (6)$$

where n represents a number of divisions between two correction data tables A and B adjacent to the obtained optical parameter X in which the n is sufficiently large enough for obtaining a required accuracy and the obtained optical parameter X is included in the k-th division.

From equation (6), the interpolated correction data associated with three parameters including either the focus position or iris position in addition to the zoom position and image height can be calculated. By repeating like calculations with respect to the focus position or iris position using this method, the correction data substantially corresponding to all the four parameters can be calculated.

The linear approximation process is not necessarily required to be performed. The linear approximation process may be omitted according to circumstances, since increasing the number of division of data or the number of table to ensure required accuracy requires a larger memory capacity but a smaller calculation amount. Although in the second embodiment the linear approximation process is performed in the interchangeable lens 1, the same effect can be achieved if it is performed in the camera body 100.

(Third Embodiment)

Figure 9:
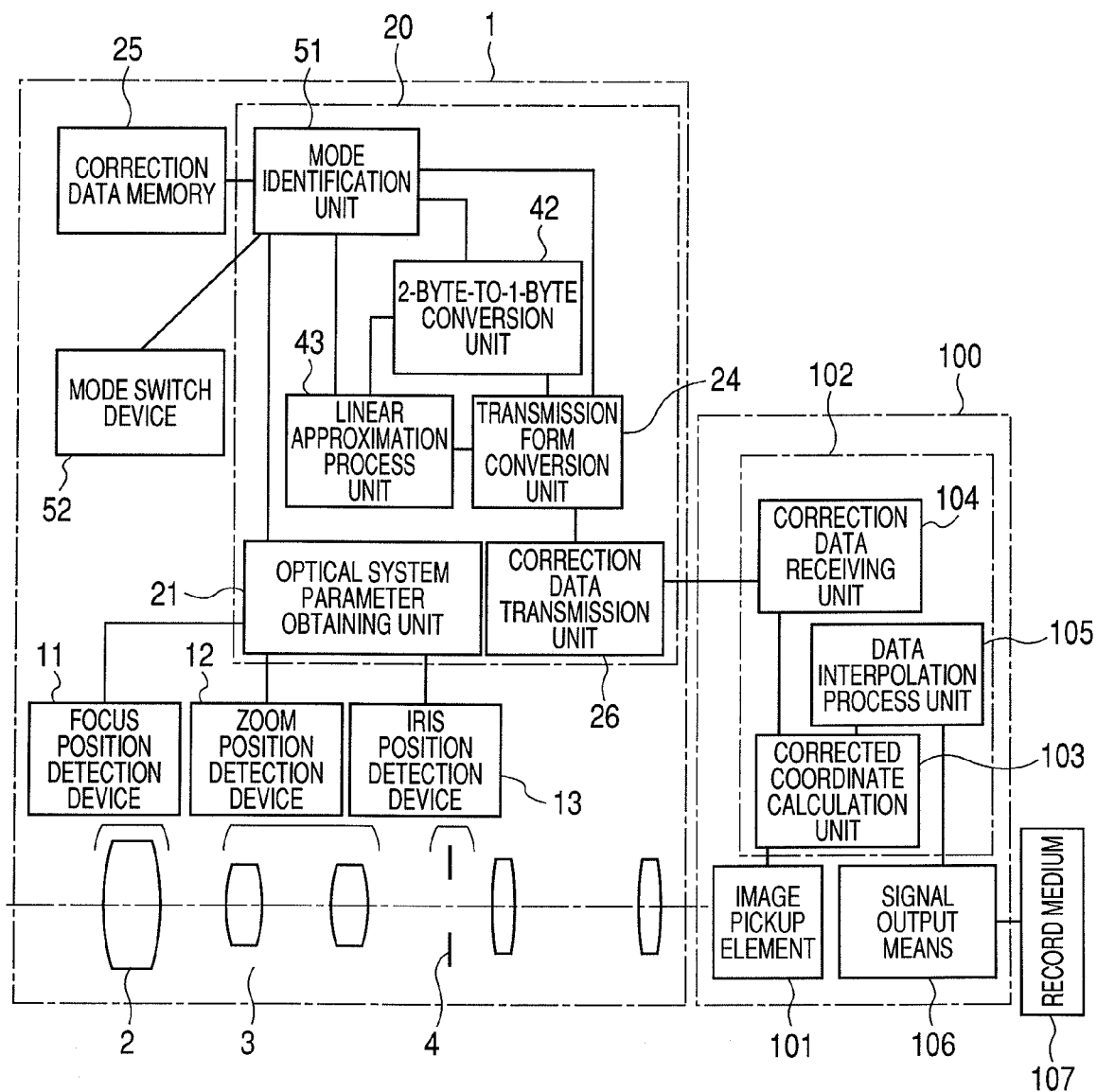
FIG. 9 is a diagram showing the configuration of a third embodiment.

FIG. 9 is a diagram showing the configuration of an apparatus according a third embodiment. In FIG. 9, the components same as those in FIG. 1 and FIG. 5 are given the same reference signs. The output of an optical system parameter obtaining unit 21 that obtains the positions detected by the focus position detection device 11, the zoom position detection device 12 and the iris position detection device 13 is connected to a mode identification unit 51. To the mode identification unit 51 is connected the output of the mode switch device 52 in the form of a switch or the like. The interchangeable lens 1 does not have a characteristic data receiving unit 23, and the camera body 100 does not have a characteristic data transmission unit 108.

Figure 10:
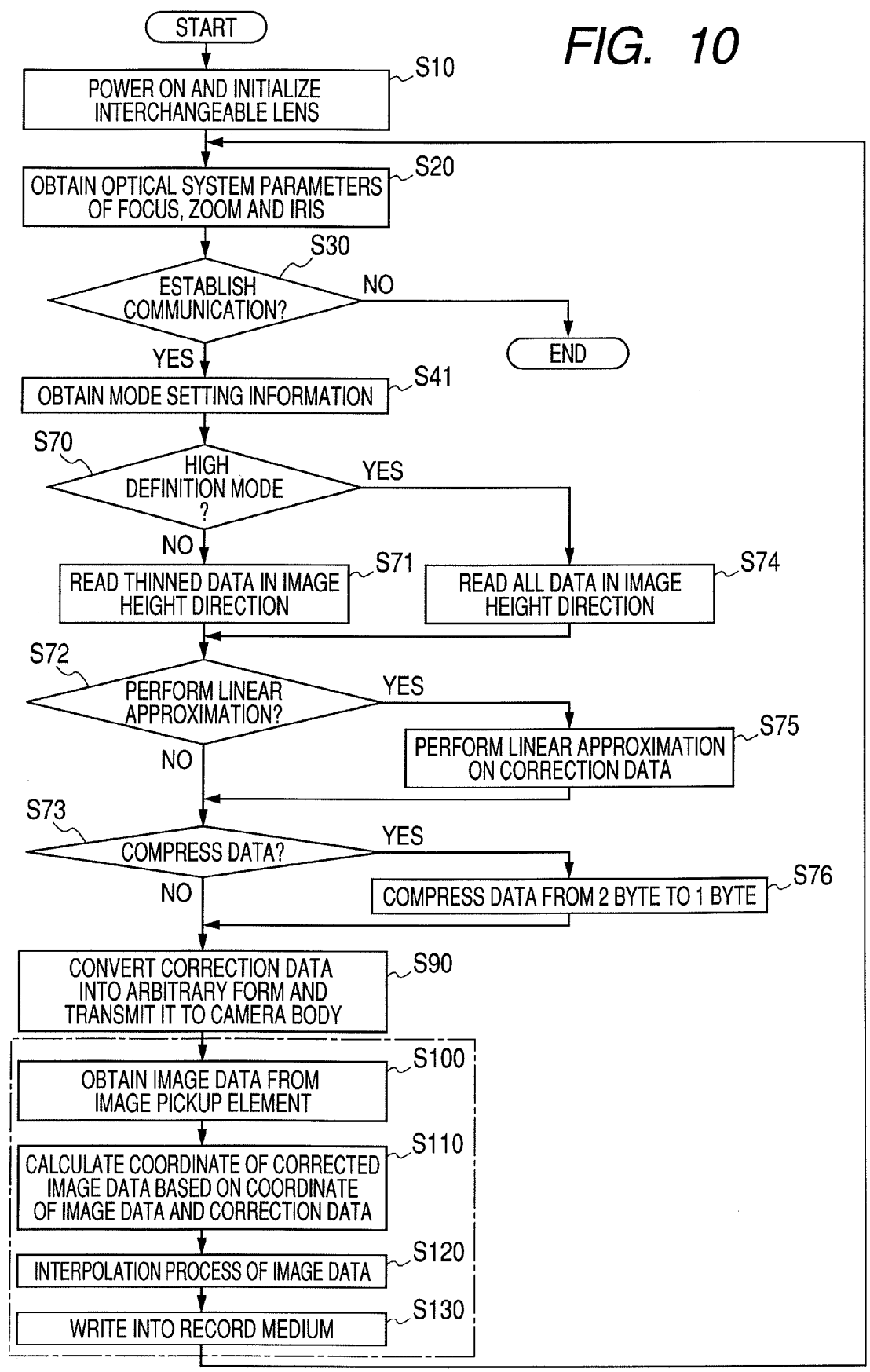
FIG. 10 is a flow chart of a process according to the third embodiment.

FIG. 10 is a flow chart of a process in the apparatus according to the third embodiment. Steps S10 to S30 are the same as those in the flow chart of FIG. 2. After establishment of communication in step S30, the mode identification unit 51 reads mode information set by the mode switch device 52 to identify the mode currently set (step S41). First, a determination is made as to whether the current mode is high definition mode or not (step S70). If it is determined that the current mode is the high definition mode, correction data matching to or nearly matching to the optical system parameters that have already obtained in step S20 is read (step S74).

If the current mode is not the high definition mode, data matching to or nearly matching to the optical system parameter that have already been obtained in step S20 is read with the data being thinned with respect to the image height components (step S71). Then, a determination is made as to whether linear approximation is to be performed or not (step S72). If the linear approximation is to be performed, the data read is sent to the linear approximation process unit 43, where linear approximation process is performed (step S75).

Then, a determination is made as to whether data compression is to be performed or not (step S73). If data compression is to be performed, the data is sent to a 2-byte-to-1-byte conversion unit 42, where the data is compressed at a compression ratio of 256:1 (the fractional portion being disregarded) (step S76). The data on which linear approximation and/or data compression has been performed is sent to a transmission form conversion unit 24 after these processes. If these processes are not applied, the data is sent to the transmission form conversion unit 24 without being transferred to the linear approximation process unit 43 or the 2-byte-to-1-byte conversion unit 42. Then, the data is sent to a correction data receiving unit 104 via a correction data transmission unit 26 after converted into data having a form for transmission (step S90).

The process in steps S100 to S130 executed in the camera body 100 is the same as that in the flow chart of FIG. 2.

(Fourth Embodiment)

Figure 11:
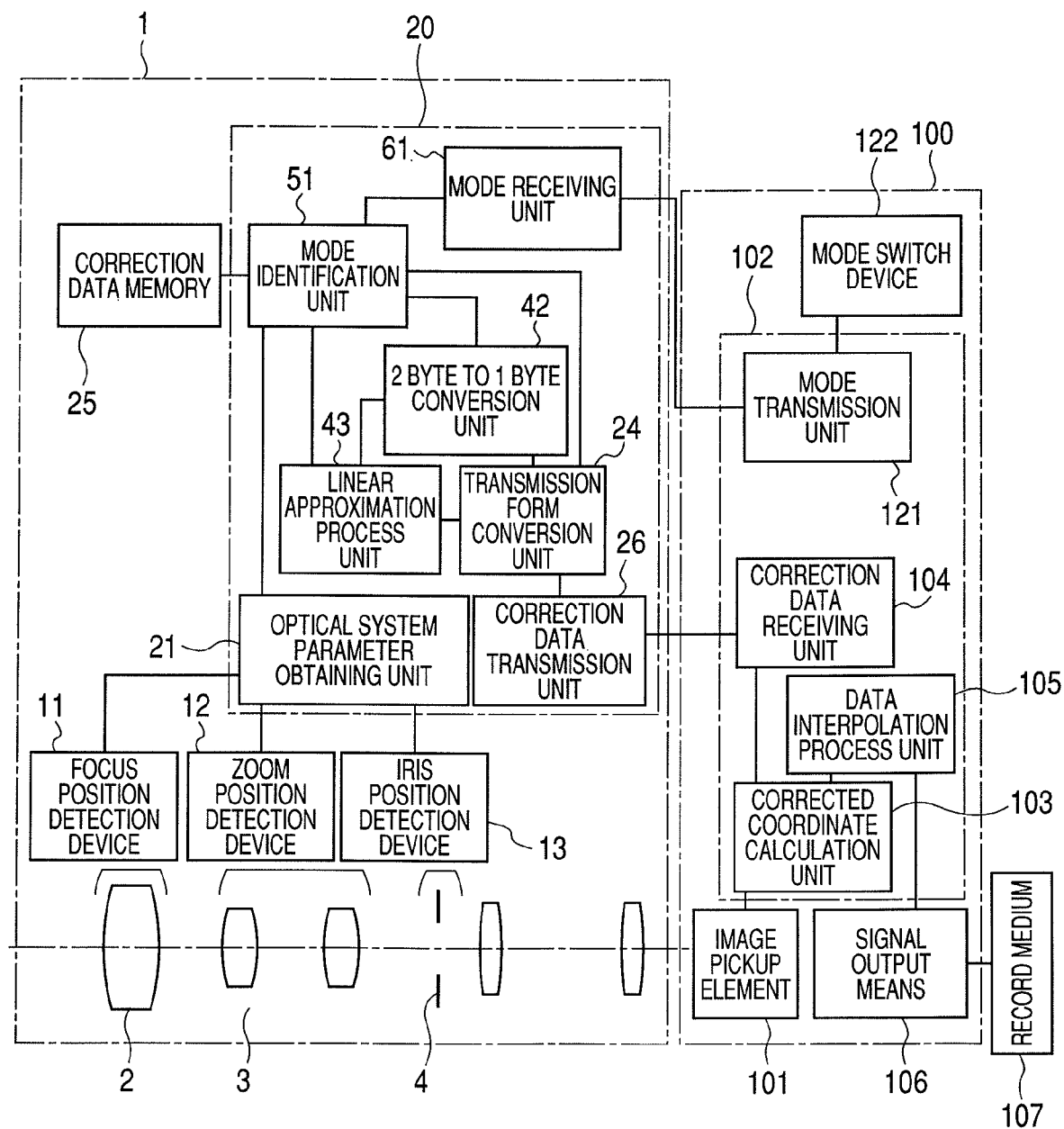
FIG. 11 is a diagram showing the configuration of a fourth embodiment.

FIG. 11 is a diagram showing the configuration of the apparatus according to the fourth embodiment. In FIG. 11, the components same as those in FIGS. 1, 5 and 9 are given the same reference numerals. To a mode identification unit 51 is connected a mode receiving unit 61, which, in turn, is connected with a mode transmission unit 121 in the camera body 100. To the mode transmission unit 121 in the camera body 100 is connected a mode switch device 122.

Figure 12:
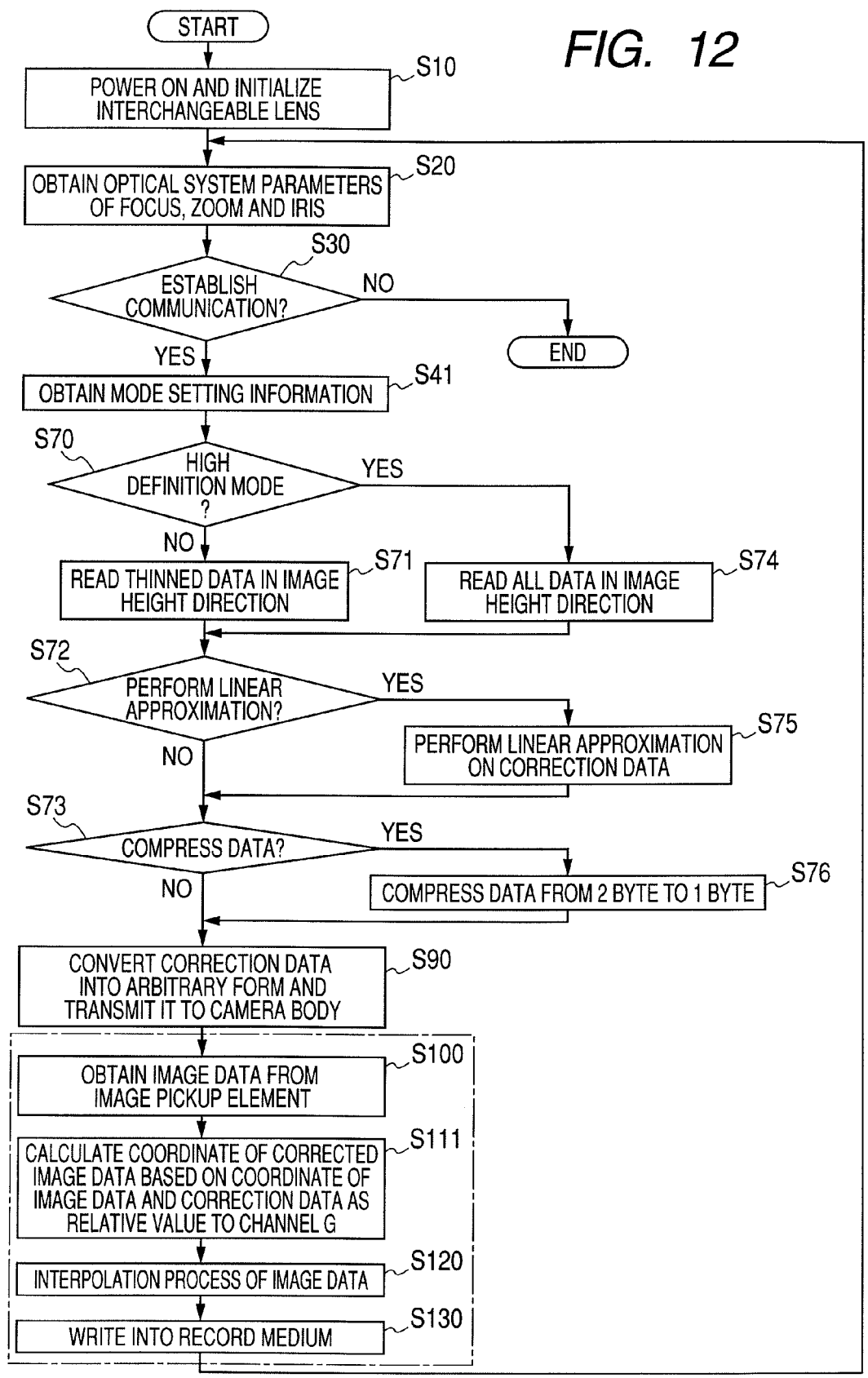
FIG. 12 is a flow chart of a process according to the fourth embodiment.

FIG. 12 is a flow chart of a process in the apparatus according to fourth embodiment. Steps S10 to S30 are the same as those in the flow chart of FIG. 2. After establishment of communication in step S30, the mode transmission unit 121 in the camera body 100 reads a mode switch request set by the mode switch device 122. The mode switch request is transferred to the mode identification unit 51 via the mode receiving unit 61 in the interchangeable lens 1. Thus, the current mode is identified (step S41). Steps S70 to S90 are the same as those in the flow chart of FIG. 10.

The object image taken by camera body 100 is imaged on the image pickup element 101 through the optical system. The object image is output as image data and sent to a corrected coordinate calculation unit 103 (step S100). The corrected coordinate calculation unit 103 receives correction data from the correction data receiving unit 104. The image data supplied from the image pickup element 101 is separated into position data and brightness data for each of the R, G and B channels. Then, coordinate data correction value for each of R, G and B is calculated using the correction data and position data for each channel. Since the correction data is data of lateral chromatic aberration, the correction values are expressed as values relative to the G channel. Therefore, the position coordinates of the R channel and the B channel are corrected as relative values relative to the position data of the G channel image (step S111). Then, interpolation process is performed in a data interpolation process unit 105 (step S120).

After the interpolation, the interpolated image data is sent to signal output means 106. The signal output means 106 transfers the signal to a recording medium 107 to write it into the recording medium 107 (step S130).

(Fifth Embodiment)

Figure 13:
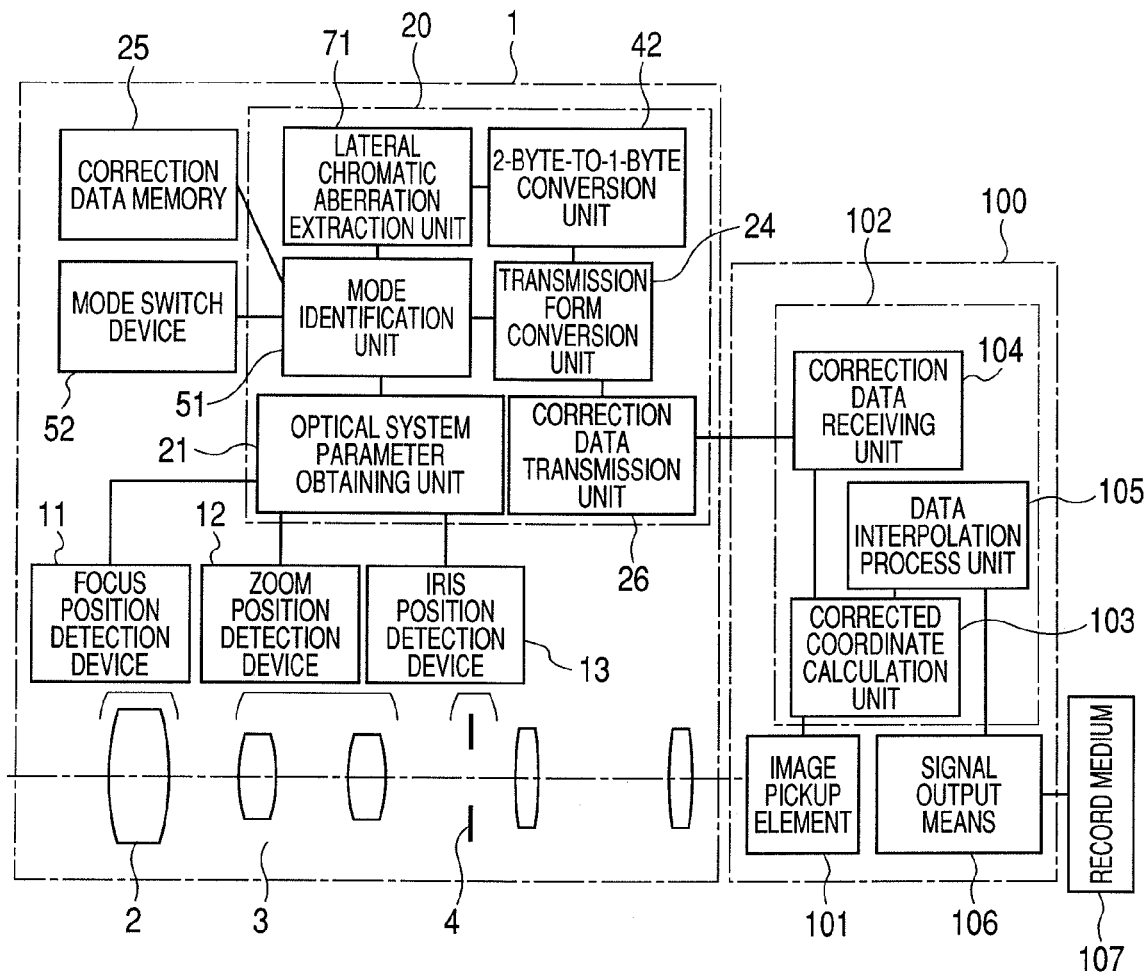
FIG. 13 is a diagram showing the configuration of a fifth embodiment.

FIG. 13 is a diagram showing the configuration of the apparatus according to fifth embodiment. In FIG. 13, the components the same as those in the third embodiment shown in FIG. 9 are given the same reference numerals. The apparatus has a lateral chromatic aberration extraction unit 71 provided between a mode identification unit 51 and a 2-byte-to-1-byte conversion unit 42.

Figure 14:
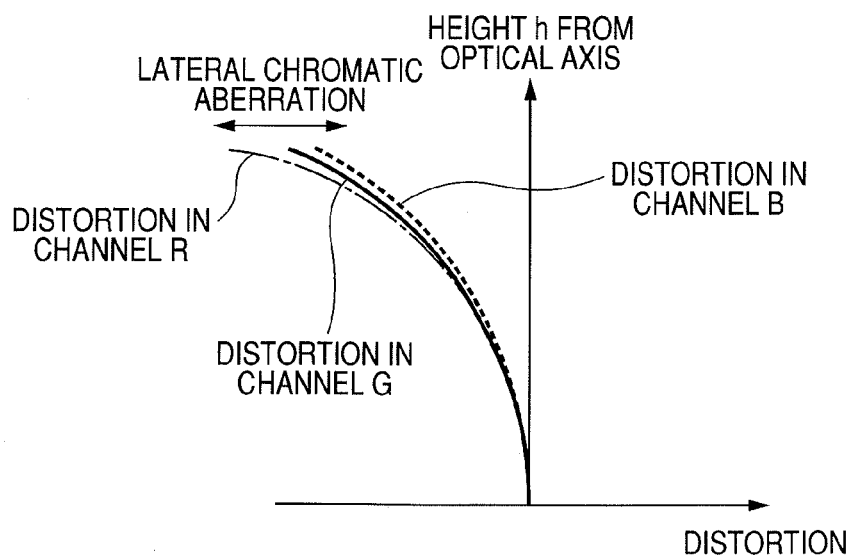
FIG. 14 shows a comparison of distortion and lateral chromatic aberration.

As shown in FIG. 14, the magnitude of required correction differs between lateral chromatic aberration and distortion. To correct distortion, data having a size of 2 byte is generally required in the case of HD as described in the second embodiment. On the other hand, lateral chromatic aberration is generally on the order of 30 μm at maximum, which is as small as 6 pixels in view of the HD resolution of 1920×1080 pixels, and represented sufficiently by 1 byte data. To reduce the data amount in view of the above fact, a mode switch function to separately process lateral chromatic aberration and distortion separately is provided in the mode switch device 52.

The mode identification unit 51 is informed of the above described process scheme by the mode switch device 52 and determines the process scheme. On the other hand, optical system parameters concerning the focus position, zoom position and iris position are sent to the optical system parameter obtaining unit 21 from the respective position detection devices 11 to 13, so that the initial status of the optical system is recognized.

The mode identification unit 51 reads desired data associated with the optical parameters based on the values of the optical parameters. In the case where only lateral chromatic aberration is to be corrected, the data is sent to the lateral chromatic aberration extraction unit 71, where it is converted into ΔR' and ΔB' by the following equation.

$$\Delta R'(h,z,f,i) = \Delta R(h,z,f,i) - \Delta G(h,z,f,i)$$

$$\Delta B'(h,z,f,i) = \Delta B(h,z,f,i) - \Delta G(h,z,f,i) \quad (7)$$

Since this data has a pitch that is excessively fine in view of the required accuracy of correction, the data is sent to the 2-byte-to-1-byte conversion unit 42 for data compression. To reduce the data amount, the data may be transmitted to the camera body 100 as data in the form of lateral chromatic aberrations in the R channel and B channel relative to the distortion in the G channel. In this case, while the data on the G channel is transmitted in a normal manner, the data on the R and B channels is transmitted to the camera body 100 after extraction and data compression in the same manner as described above. When the data is transmitted to the camera body 100, the data form is converted into a data form for transmission in the transmission form conversion unit 24 in a similar manner as in the first to third embodiments, and then the data is transmitted from the correction data transmission unit 26 to the correction data receiving unit 104.

The lateral chromatic aberrations in the R/B channel may be construed as the difference between the distortion of the R/B channel and the distortion of the G channel. Therefore, the following four cases can be supposed: the case where only the distortion amount is used, the case where the distortion amounts in all the color channels are used, the case where the distortion amount in the G channel and the lateral chromatic aberration in the R and B channels relative to the G channel are used, and the case where only the lateral chromatic aberration in the R and B channel is used.

Figure 15:
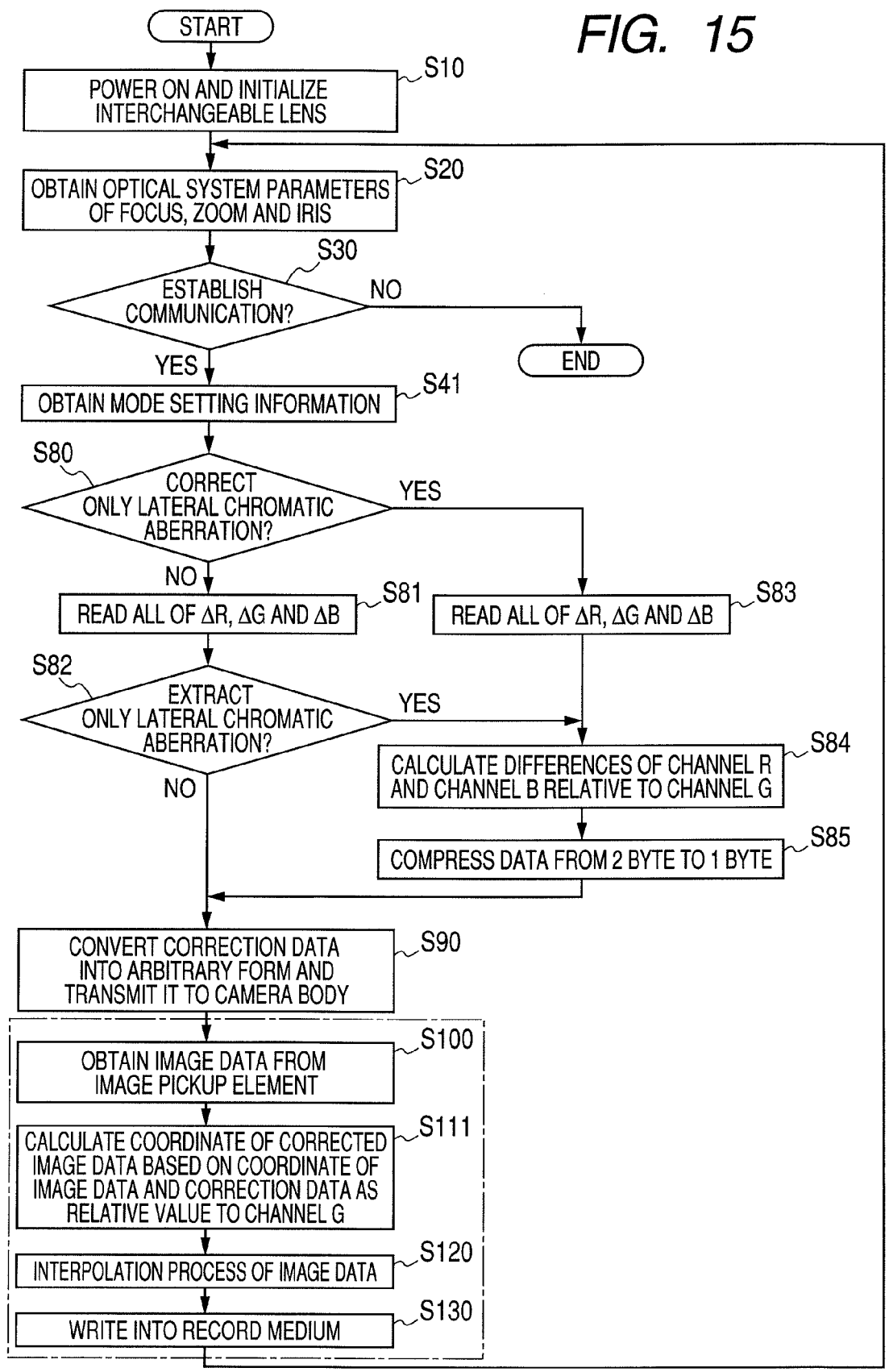
FIG. 15 is a flow chart of a process according to the fifth embodiment.
Figure 16:
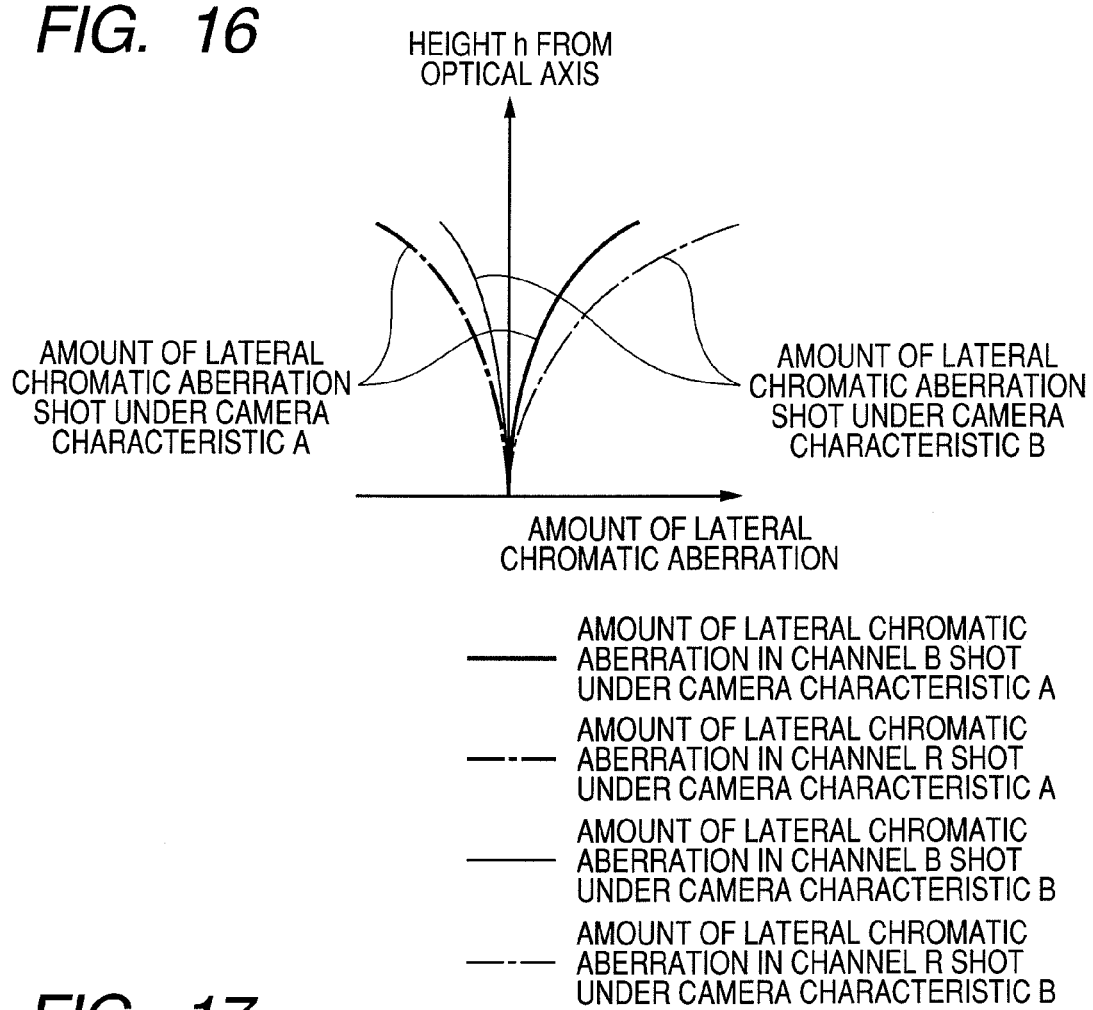
FIG. 16 is a graph showing relationship between camera characteristics and lateral chromatic aberration.

FIG. 15 is a flow chart of a process in the apparatus according to the fifth embodiment. Steps S10 to S41 are the same as those in the flow chart of FIG. 10.

First, a determination is made as to whether or not the mode is one in which only lateral chromatic aberration is corrected (step S80). If in the mode in which only lateral chromatic aberration is corrected, correction data matching to or nearly matching to the optical system parameters that have already been obtained in step S20 is read (step S83). Then, the differences of the R channel and the B channel relative to the G channel are calculated in the lateral chromatic aberration extraction unit 71 (step S84). Data on the differences thus calculated is compressed in the 2-byte-to-1-byte conversion unit 42 and sent to the transmission form conversion unit 24 (step S85).

If in the mode in which not only lateral chromatic aberration but also distortion is corrected, correction data matching to or nearly matching to the optical system parameters that have already been obtained in step S20 is read in the same manner as above (step S81). Then, a determination is made as to whether or not only the data on lateral chromatic aberration is to be compressed for data compression (step S82). If only the data on lateral chromatic aberration is to be compressed, the lateral chromatic aberrations in the R channel and the B channel are extracted as differences between distortions in these channels and the distortion in the G channel, by the lateral chromatic aberration extraction unit 71 (step S84). The data on the lateral chromatic aberrations in the R and B channels are compressed in the 2-byte-to-1-byte conversion unit 42 and sent to the transmission form conversion unit 24 (step S85). In this process, the data on the G channel is directly sent to the transmission form conversion unit 24 without passing through the lateral chromatic aberration extraction unit 71 or the 2-byte-to-1-byte conversion unit 42.

If in the mode in which no process is to be performed, the data components in all the R, G and B channels are directly sent to the transmission form conversion unit 24 without passing through the lateral chromatic aberration extraction unit 71 or the 2-byte-to-1-byte conversion unit 42. The data received in the transmission form conversion unit 24 is converted into data having a form for transmission, and sent to the correction data receiving unit 104 through the correction data transmission unit 26 (step S90).

The processes of steps S100 to S130 are the same as those in the flow chart of FIG. 12.

(Sixth Embodiment)

A sixth embodiment will be described in the following. In the description of the sixth embodiment, differences in the shooting condition refer to differences in the spectral distribution of the light emitted from the light source with which the object to be shot is illuminated. What is actually detected (or measured) is the spectral distribution of the light incident on a sensor provided in the image shooting apparatus or the interchangeable lens used in shooting, and differences or variations in the shooting condition refer to differences or variations in the result of detection by the sensor.

Figure 17:
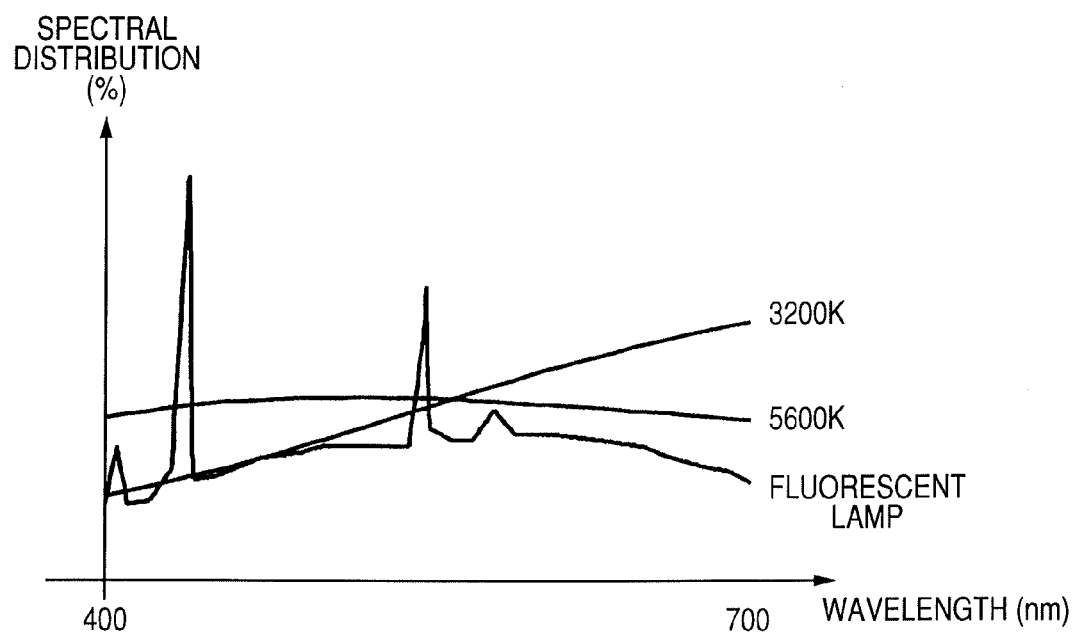
FIG. 17 shows spectral distributions of various light sources in a comparative manner.

Examples of the spectral distribution are shown in FIG. 17. In FIG. 17 are shown the spectral distribution of light emitted from an electric lamp (with a color temperature of 3200 K) designated by "3200K", the spectral distribution of sunlight (with a color temperature of 5600 K) designated by "5600K" and the spectral distribution of light emitted from a fluorescent lamp designated by "FLUORESCENT LAMP". While sunlight (with a color temperature of 5600 K) has a relatively flat spectrum as compared to other kinds of light, light emitted from the electric light (with a color temperature of 3200 K) has a spectrum having increasing intensity toward the longer wavelength. Therefore, in the case where an image is taken under electric lighting, the center wavelength (centroid wavelength) of each color (red, green and blue, etc.) is shifted from the center wavelength (centroid wavelength) of each color in the case where an image is taken under sunlight, and accordingly the effect of lateral chromatic aberration on the image is different from that on an image taken under sunlight. In the case where an image is taken under light, such as fluorescent light, having brightline spectrum or peaks in the spectral distribution at which the intensity is extremely high, the center wavelength (centroid wavelength) of a color light including that peak is shifted, and the effect of lateral chromatic aberration on the image is different from that on an image taken under sunlight.

Besides the above, there is supposed to be the following cases in which the effect of lateral chromatic aberration on an image changes.

If the characteristic of an optical element (such as a filter or prism) that blocks infrared or ultraviolet light (to prevent such light from being incident on the image pickup element) provided in the camera body changes, the wavelength range of red light or blue light will change. Specifically, the wavelength range of each color light changes with the characteristic of the optical element that blocks infrared or ultraviolet light, and hence a change in the center wavelength (centroid wavelength) of each color light. When the wavelength ranges of red light and blue light change, the center wavelengths (centroid wavelengths) of the respective color lights change, and consequently the effect of lateral chromatic aberration on an image changes. Furthermore, we can suppose that an interchangeable lens is mounted on an image pickup apparatus having a color separation optical system (such as a color separation prism) that separates light to be shot having passed through the interchangeable lens into red light, green light and blue light. In this case, a change in the characteristic of the color separation optical system causes a change in the wavelength range of each color light. The change in the wavelength range of each color light causes a change in the center wavelength (centroid wavelength) of the color light. As a result, the effect of lateral chromatic aberration on an image changes.

Here, a change in the effect of lateral chromatic aberration on an image refers to an increase in the effect, on an image, of the light in a certain wavelength range that does not significantly affect the image quality in spite of presence of lateral chromatic aberration in the case of, for example, image taking under sunlight. For example, there may be cases where the spectral distribution in the aforementioned wavelength range becomes remarkably high due to a change in the shooting condition (i.e. the spectral distribution of the light with which the object to be shot is illuminated), whereby adverse effects of lateral chromatic aberration become visible. Such a situation is referred to as a change in the effect of lateral chromatic aberration on an image. This can be found remarkably, for example, in the appearance of mercury vapor lamp illumination in night shots.

Figure 18:
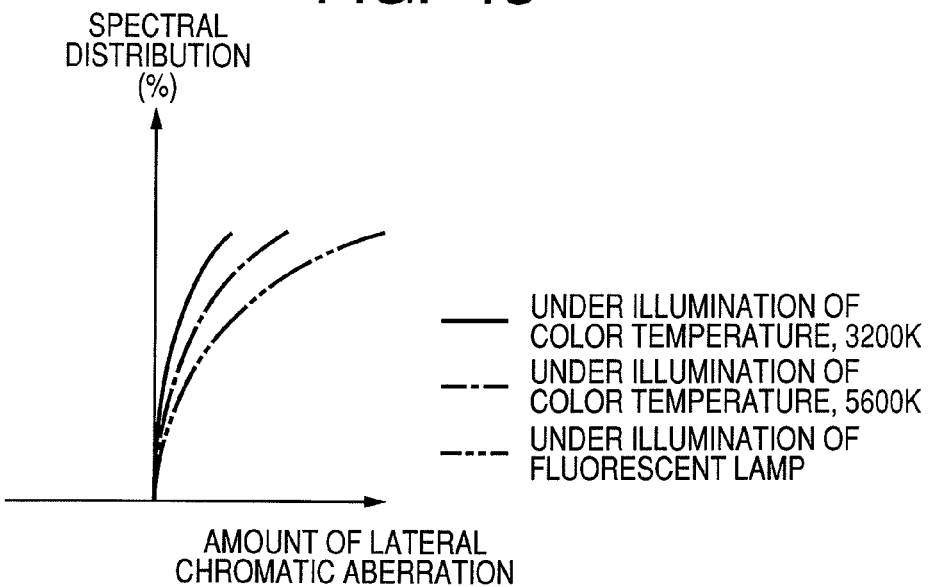
FIG. 18 is a graph showing lateral chromatic aberrations in association with light sources.

FIG. 18 shows the amount of lateral chromatic aberration to be corrected in the cases where the object to be shot is illuminated with the aforementioned light of an electric lamp, sunlight and light of fluorescent lamp. Thus, even if there are various shooting conditions different from one another (i.e. situations in which shooting is performed under light from light sources different from one another), images having equal qualities can be obtained by correcting lateral chromatic aberration by different correction amounts in different shooting conditions.

Figure 19:
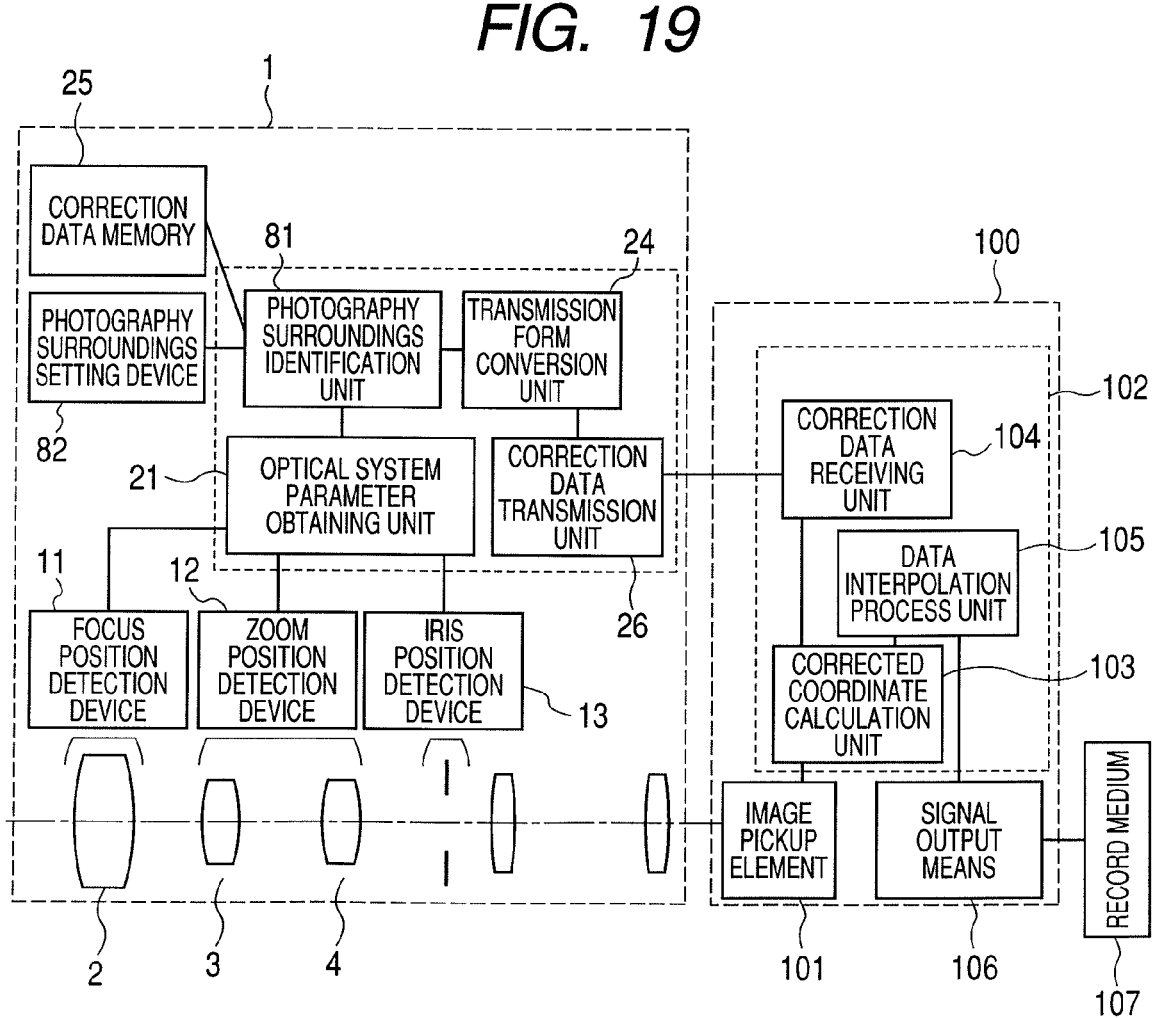
FIG. 19 is a diagram showing the configuration of a sixth embodiment.

FIG. 19 is a diagram showing the configuration of an apparatus according to the sixth embodiment. In FIG. 19, the components same as those in FIGS. 1, 5, 11 and 13 are given the same reference numerals. The output of an optical system parameter obtaining unit 21 that obtains the positions of focus, zoom and iris from a focus position detection device 11, a zoom position detection device 12 and an iris position detection device 13 is connected to a photography surroundings identification unit 81. To the photography surroundings identification unit 81 is connected the output of a photography surroundings setting device 82 in the form of a switch or the like. The photography surroundings identification unit 81 identifies (i.e. distinguishes and determines) the photography surroundings based on setting of photography surroundings entered by the camera operator or other person. Although in this embodiment the photography surroundings setting device 82 is provided in the interchangeable lens 1, the same effect will also be achieved in the case where it is provided in the camera body 100.

Figure 20:
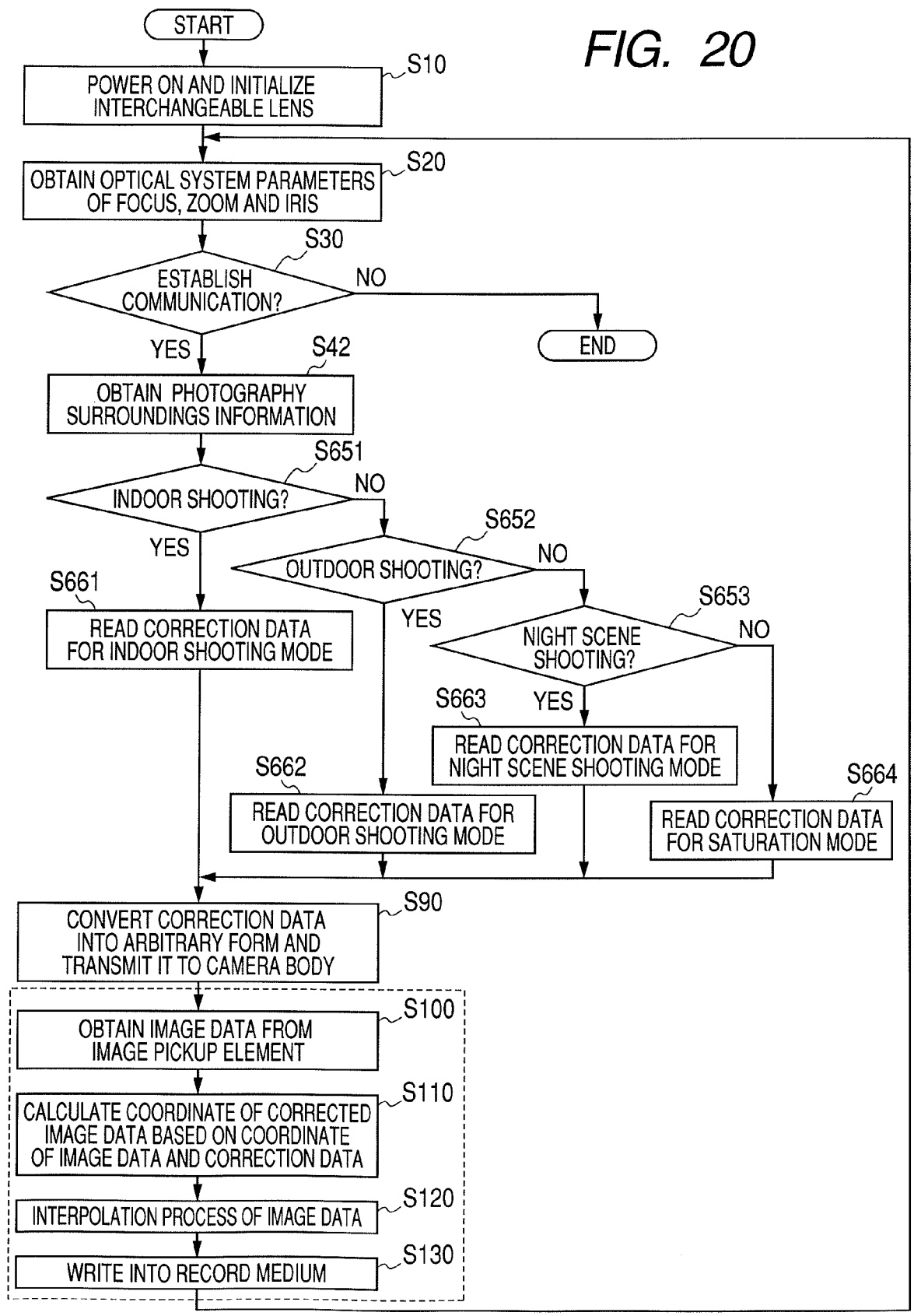
FIG. 20 is a flow chart of a process according to the sixth embodiment.

FIG. 20 is a flow chart of a process in the apparatus according to the sixth embodiment. Steps S10 to S30 are the same as those in the flow chart of FIG. 2. After establishment of communication in step S30, the photography surroundings identification unit 81 reads photography surroundings information set by the photography surroundings setting means 82 and identifies the current photography surroundings (step S42).

Then, the photography surroundings identification unit 81 determines how the photography surroundings are according to the process of steps S651 to S653. Although a process of identifying the photography surroundings as either one of indoor, outdoor, outdoor in the night (night scene) and surrounding in which saturation (saturation of signals) occurs is described here, other photography surroundings may also be subjected to the identification of the photography surroundings.

Then, appropriate correction data (data for correction of lateral chromatic aberration) suitable for the respective photography surrounding is read from a correction data memory 25 (steps S661 to S664).

Then, the data form of the correction data is converted into a data form for transmission in a transmission form conversion unit 24, and thereafter the data is transmitted to a correction data receiving unit 104 via a correction data transmission unit 26 (step S90).

The processes in steps S100 to S130 executed in the camera body are the same as those in the flow chart of FIG. 2.

(Seventh Embodiment)

Figure 21:
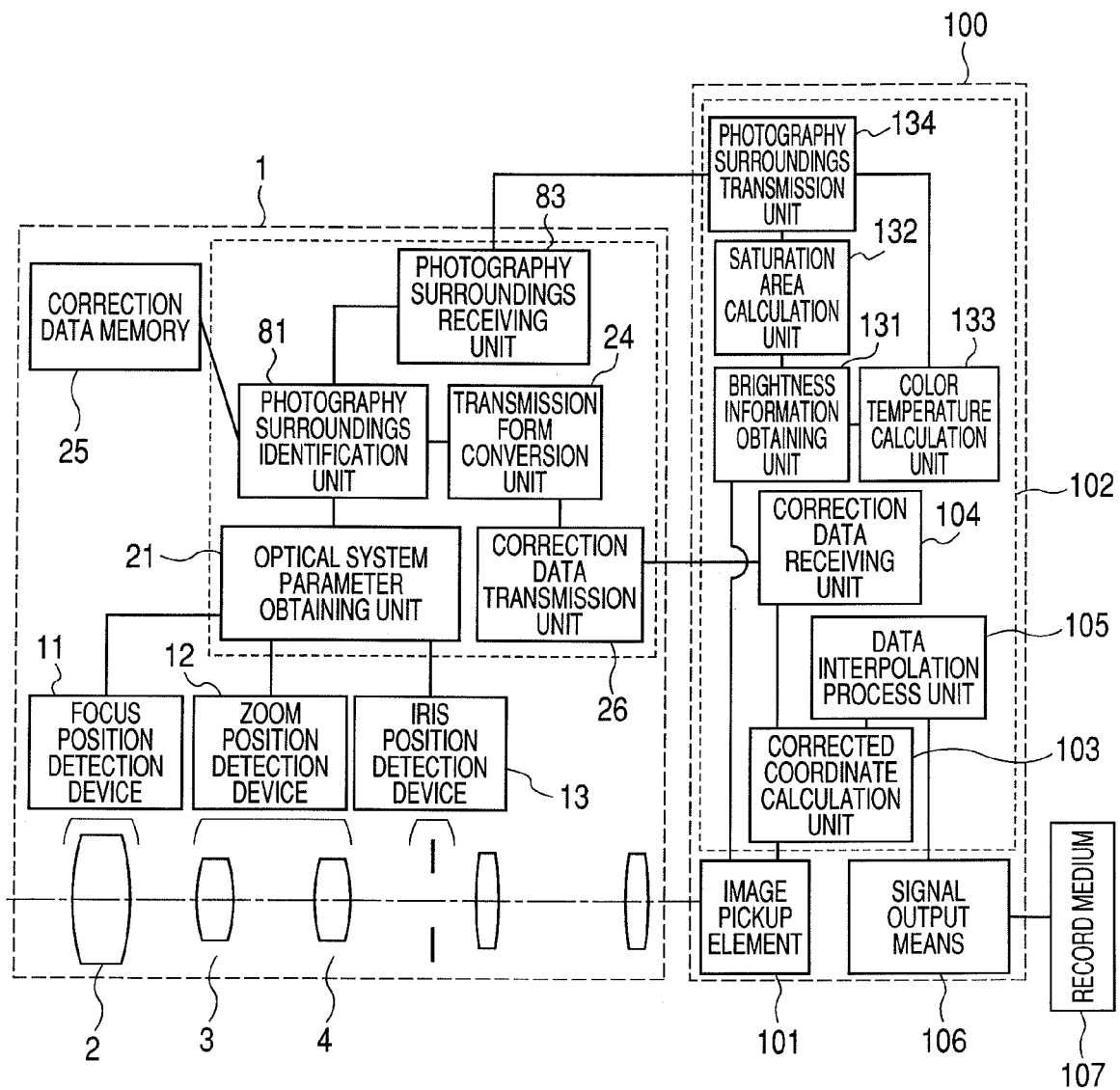
FIG. 21 is a diagram showing the configuration of a seventh embodiment.

FIG. 21 is a diagram showing the configuration of an apparatus according to a seventh embodiment. In FIG. 21, the components same as those in FIGS. 1, 5, 11, 13 and 19 are given the same reference numerals. The apparatus is additionally provided with a brightness information obtaining unit 131 that obtains brightness information (or spectral distribution) of an image signal from an image pickup element 101, a saturation area calculation unit 132 that calculates the saturation area in the image based on the brightness information and a color temperature calculation unit 133 that calculates the color temperature based on the brightness information. The apparatus is further provided with a photography surroundings transmission unit 134 that transmits such information (on photography surroundings) from the camera body 100 to the interchangeable lens 1 and a photography surroundings receiving unit 83 through which the interchangeable lens 1 receives the information (on photography surroundings) from the camera body 100.

Figure 22:
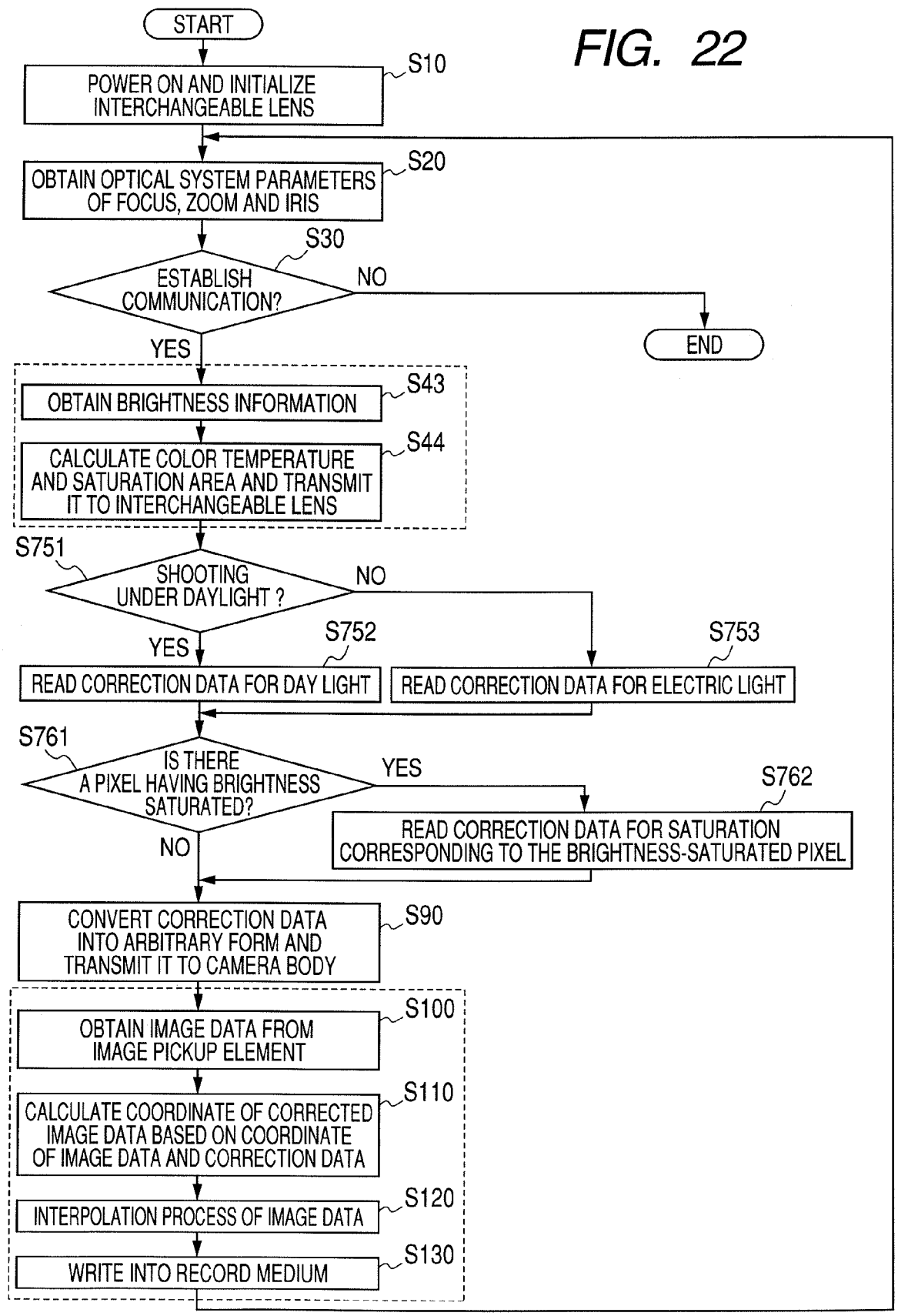
FIG. 22 is a flow chart of a process according to the seventh embodiment.

FIG. 22 is a flow chart of a process in the apparatus according to the seventh embodiment. Steps S10 to S30 are the same as those in the flow chart of FIG. 2. After establishment of communication in step S30, the brightness information obtaining unit 131 in the camera body 100 extracts brightness information from the image signal developed by the image pickup element 101 (step S43). The brightness information is sent to the saturation area calculation unit 132 and the color temperature calculation unit 133, where pixels in which the brightness saturation is occurring and the color temperature of the photography surroundings are calculated in the respective units and transferred to the photography surroundings identification unit 81 via the photography surroundings transmission unit 134 and the photography surroundings receiving unit 83 (step S44).

The photography surroundings identification unit 81 first reads correction data for daylight or correction data for electric light from the correction data memory 25 based on color temperature information under the photography surroundings (steps S751 to S753).

Then, the photography surroundings identification unit 81 reads correction data for saturation from the correction data memory 25 for the pixels in which saturation is occurring based on brightness saturation information for each pixels (steps S761 to S762).

The correction data is converted into data having a form for transmission in the transmission form conversion unit 24 and then transmitted to the correction data receiving unit 104 via the correction data transmission unit 26 (step S90).

The processes in steps S100 to S130 executed in the camera body 100 are the same as those in the flow chart of FIG. 2.

Although in the seventh embodiment the photography surroundings identification unit 81 identifies the photography surroundings based on the signal input to the image pickup element 101 (i.e. light to be shot incident on the image pickup element 101), this is not essential to the present invention. For example, identification of the photography surroundings may be performed using a measuring device (such as a brightness sensor or illuminance meter) provided separately from the image pickup element 101. Such a measuring device may be provided either in the camera body 100 or in the interchangeable lens 1. Alternatively, a portion of light to be shot may be separated and the aforementioned measuring device may be arranged to receive the separated light. The measuring device may be adapted to function also as a measuring device (brightness sensor) for auto-focusing (AF).

According to the interchangeable lens according to the embodiment, since suitable data can be transmitted from the interchangeable lens to the camera body according to surroundings, clear images with small aberration can be obtained in the camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-090305, filed Mar. 30, 2007, which is hereby incorporated by reference herein in its entirety.

What is claimed is:

1. An interchangeable lens mountable on a camera body, the interchangeable lens comprising:
   a receiving unit that receives information on photography surroundings including characteristics of the camera body; and
   a transmission unit that transmits data, which relates to a lateral chromatic aberration, to the camera body based on the photography surroundings information received by the receiving unit,
   wherein the data is used in a process performed for one or more color images among a plurality of color images imaged by the camera body to reduce an influence of the lateral chromatic aberration, and
   wherein the transmission unit transmits different data, depending on the photography surroundings, to the camera body.

2. The interchangeable lens according to claim 1,
wherein the information on photography surroundings comprises information on the type of the camera body, and
wherein the receiving unit receives the information on the type of the camera body from the camera body.

3. The interchangeable lens according to claim 1,
wherein the information on photography surroundings comprises information on the shooting mode of the camera body, and
wherein the receiving unit receives the information on the shooting mode of the camera body from the camera body.

4. The interchangeable lens according to claim 1,
wherein the information on photography surroundings comprises information on light to be shot incident on an image pickup element provided in the camera body, and
wherein the receiving unit receives the information on light to be shot incident on the image pickup element provided in the camera body from the camera body.

5. The interchangeable lens according to claim 4, wherein the information on light to be shot incident on the image pickup element provided in the camera body comprises information on spectral distribution of the light to be shot.

6. The interchangeable lens according to claim 1, further comprising:
a light receiving sensor,
wherein the information on photography surroundings comprises information supplied from the light receiving sensor.

7. The interchangeable lens according to claim 1,
wherein the camera body is provided with a color separation optical system that separates light to be shot coming from the interchangeable lens into three color lights, and
wherein the camera body is provided with three image pickup elements associated with the three color lights.

8. The interchangeable lens according to claim 1, wherein the data for correction of the aberration comprises data concerning a distortion amount.

9. The interchangeable lens according to claim 1, wherein the data for correction of the aberration comprises data concerning a lateral chromatic aberration.

10. A camera apparatus comprising:
an interchangeable lens according to claim 1; and
a camera body including an image pickup element that picks up an object image coming from the interchangeable lens.

11. The interchangeable lens according to claim 1, wherein the data for correction of the aberration is data for correction of a lateral chromatic aberration.

12. The interchangeable lens according to claim 1, wherein the characteristics of the camera body includes characteristics of an optical element disposed in the camera body.

13. The interchangeable lens according to claim 12, wherein the optical element includes characteristics of a color separation prism disposed in the camera body.

14. The camera apparatus according to claim 10, further comprising a color separation prism,
wherein the characteristics of the camera body include characteristics of a color separation prism disposed in the camera body.

15. The camera apparatus according to claim 10, further comprising:
a process unit which performs a processing of one or more color images among a plurality of color images picked up by the camera body to reduce an influence of the lateral chromatic aberration,
wherein the process unit performs a processing for one or more color images based on the data.

* * * * *